(12) United States Patent
Lee et al.

(10) Patent No.: US 8,774,297 B2
(45) Date of Patent: *Jul. 8, 2014

(54) TRANSMITTING SPREAD SIGNAL IN COMMUNICATION SYSTEM

(75) Inventors: Jung Hoon Lee, Seoul (KR); Ki Jun Kim, Seoul (KR); Dong Wook Roh, Seoul (KR); Dae Won Lee, Suwon-si (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,455

(22) Filed: Mar. 10, 2011

(65) Prior Publication Data

US 2011/0158292 A1    Jun. 30, 2011

Related U.S. Application Data

(66) Continuation of application No. 12/139,254, filed on Jun. 13, 2008, now Pat. No. 7,953,169, Substitute for application No. 60/983,234, filed on Oct. 29, 2007.

(60) Provisional application No. 60/943,783, filed on Jun. 13, 2007, provisional application No. 60/955,019, filed on Aug. 9, 2007, provisional application No. 60/976,487, filed on Oct. 1, 2007, provisional application No. 60/982,435, filed on Oct. 25, 2007.

(30) Foreign Application Priority Data

Nov. 29, 2007    (KR) .......................... 10-2007-122986

(51) Int. Cl.
    *H04L 27/28*    (2006.01)
(52) U.S. Cl.
    USPC ....................................................... 375/260

(58) Field of Classification Search
    USPC ........................... 375/259, 260, 267; 370/342
    See application file for complete search history.

(56) References Cited

U.S. PATENT DOCUMENTS 5,870,391 A    2/1999    Nago
6,452,936 B1   9/2002    Shiino
(Continued)

FOREIGN PATENT DOCUMENTS

CN    1829373    9/2006
EP    1185001    3/2002
(Continued)

OTHER PUBLICATIONS

LG Electronics, "DL ACK/NACK structure", R1-072878, 3GPP TSG RAN WG1 #49bis, Jun. 2007.*

(Continued)

*Primary Examiner* — Kevin M Burd
(74) *Attorney, Agent, or Firm* — Lee, Hong, Degerman, Kang & Waimey

(57) ABSTRACT

The present invention provides for transmitting a spread signal in a mobile communication system. The present invention includes spreading a signal using a plurality of spreading codes, wherein the plurality of spreading codes have a spreading factor, multiplexing the spread signal by code division multiplexing, transmitting the multiplexed signal via a plurality of neighboring frequency resources of one OFDM symbol of a first antenna set, and transmitting the same multiplexed signal via a plurality of neighboring frequency resources of one OFDM symbol of a second antenna set.

20 Claims, 16 Drawing Sheets

(56) References Cited

U.S. PATENT DOCUMENTS

| | | |
|---|---|---|
| 6,842,487 B1 | 1/2005 | Larsson |
| 6,934,318 B2 | 8/2005 | Sarkar |
| 7,069,050 B2 | 6/2006 | Yoshida |
| 7,315,577 B2 | 1/2008 | Shao |
| 7,336,633 B2 | 2/2008 | Kruys |
| 7,386,076 B2 | 6/2008 | Onggosanusi et al. |
| 7,954,032 B2 | 5/2011 | Kim et al. |
| 7,995,661 B2 | 8/2011 | Xu et al. |
| 2001/0005681 A1 | 6/2001 | Kim |
| 2001/0034236 A1 | 10/2001 | Tong et al. |
| 2003/0039227 A1 | 2/2003 | Kwak |
| 2003/0133426 A1 | 7/2003 | Schein et al. |
| 2004/0009780 A1 | 1/2004 | Dick et al. |
| 2004/0081131 A1 | 4/2004 | Walton et al. |
| 2004/0190640 A1 | 9/2004 | Dubuc et al. |
| 2005/0083977 A1 | 4/2005 | Moulsley et al. |
| 2005/0117536 A1 | 6/2005 | Cho et al. |
| 2005/0122898 A1 | 6/2005 | Jang et al. |
| 2005/0165949 A1 | 7/2005 | Teague |
| 2005/0220000 A1 | 10/2005 | Kim et al. |
| 2005/0232181 A1 | 10/2005 | Park et al. |
| 2005/0233754 A1 | 10/2005 | Beale |
| 2005/0286402 A1 | 12/2005 | Byun et al. |
| 2006/0013186 A1 | 1/2006 | Agrawal et al. |
| 2006/0045001 A1 | 3/2006 | Jalali |
| 2006/0198294 A1 | 9/2006 | Gerlach |
| 2006/0209814 A1 | 9/2006 | Fujii |
| 2006/0250941 A1 | 11/2006 | Onggosanusi et al. |
| 2006/0264218 A1 | 11/2006 | Zhang et al. |
| 2006/0274842 A1 | 12/2006 | Pan et al. |
| 2006/0280256 A1 | 12/2006 | Kwon et al. |
| 2007/0064669 A1 | 3/2007 | Classon et al. |
| 2007/0097915 A1 | 5/2007 | Papasakellariou |
| 2007/0097942 A1 | 5/2007 | Gorokhov et al. |
| 2007/0097981 A1 | 5/2007 | Papasakellariou |
| 2007/0110104 A1 | 5/2007 | Sartori et al. |
| 2007/0149137 A1 | 6/2007 | Richardson et al. |
| 2007/0183533 A1 | 8/2007 | Schmidl et al. |
| 2007/0184849 A1 | 8/2007 | Zheng |
| 2007/0206559 A1 | 9/2007 | Cho et al. |
| 2007/0208986 A1 | 9/2007 | Luo et al. |
| 2007/0211667 A1 | 9/2007 | Agrawal et al. |
| 2007/0254662 A1 | 11/2007 | Khan et al. |
| 2007/0258373 A1 | 11/2007 | Frederiksen et al. |
| 2007/0258540 A1 | 11/2007 | Ratasuk et al. |
| 2008/0025247 A1 | 1/2008 | McBeath et al. |
| 2008/0025337 A1 | 1/2008 | Smith et al. |
| 2008/0090528 A1 | 4/2008 | Malladi |
| 2008/0095106 A1 | 4/2008 | Malladi et al. |
| 2008/0225784 A1 | 9/2008 | Tseng |
| 2008/0225791 A1 | 9/2008 | Pi et al. |
| 2008/0227398 A1 | 9/2008 | Haghighat et al. |
| 2008/0232307 A1 | 9/2008 | Pi et al. |
| 2008/0253469 A1 | 10/2008 | Ma et al. |
| 2008/0267158 A1 | 10/2008 | Zhang et al. |
| 2008/0304593 A1* | 12/2008 | Khan et al. .......... 375/267 |
| 2008/0310483 A1 | 12/2008 | Lee et al. |
| 2009/0059884 A1* | 3/2009 | Zhang et al. .......... 370/342 |
| 2009/0060081 A1 | 3/2009 | Zhang et al. |
| 2009/0154580 A1 | 6/2009 | Ahn et al. |
| 2009/0196279 A1 | 8/2009 | Kim et al. |
| 2009/0274037 A1 | 11/2009 | Lee et al. |
| 2009/0285163 A1 | 11/2009 | Zhang et al. |
| 2009/0310719 A1 | 12/2009 | Stirling-gallacher |
| 2009/0323615 A1 | 12/2009 | Ihm et al. |
| 2010/0002754 A1 | 1/2010 | Lee et al. |
| 2010/0034163 A1 | 2/2010 | Damnjanovic et al. |
| 2010/0098005 A1 | 4/2010 | Lee et al. |
| 2010/0260164 A1 | 10/2010 | Moon et al. |
| 2013/0294282 A1 | 11/2013 | Seo |

FOREIGN PATENT DOCUMENTS

| | | |
|---|---|---|
| EP | 1248485 | 10/2002 |
| EP | 1746810 | 1/2007 |
| EP | 1746855 | 1/2007 |
| JP | 04-074026 | 3/1992 |
| JP | 2001044900 | 2/2001 |
| JP | 2002369258 | 12/2002 |
| JP | 2004-312291 | 11/2004 |
| JP | 2004364321 | 12/2004 |
| JP | 2005244960 | 9/2005 |
| JP | 2005253073 | 9/2005 |
| JP | 2005288300 | 10/2005 |
| JP | 2006166382 | 6/2006 |
| JP | 2007-124682 | 5/2007 |
| JP | 2007-511975 | 5/2007 |
| JP | 2007-221755 | 8/2007 |
| JP | 2008-053858 | 3/2008 |
| JP | 2008-092377 | 4/2008 |
| JP | 2008092051 | 4/2008 |
| JP | 2008236018 | 10/2008 |
| JP | 2010506505 | 2/2010 |
| JP | 2011193521 | 9/2011 |
| KR | 101999013366 | 2/1999 |
| KR | 10-2002-0009079 | 2/2002 |
| KR | 1020020088085 | 11/2002 |
| KR | 1020030081464 | 10/2003 |
| KR | 1020050021965 | 3/2005 |
| KR | 10-2005-0043302 | 5/2005 |
| KR | 1020050073256 | 7/2005 |
| KR | 10-2005-0120244 | 12/2005 |
| KR | 1020060016600 | 2/2006 |
| KR | 10-2006-0081352 | 7/2006 |
| KR | 10-2006-0092055 | 8/2006 |
| KR | 1020060095576 | 8/2006 |
| KR | 1020070107614 | 11/2007 |
| KR | 10-2008-0023664 | 3/2008 |
| KR | 1020080030905 | 4/2008 |
| KR | 1020080049772 | 5/2008 |
| KR | 10-2008-0065853 | 7/2008 |
| KR | 10-2008-0096088 | 10/2008 |
| KR | 10-0894142 | 4/2009 |
| KR | 10-2009-0082843 | 7/2009 |
| RU | 2142672 | 10/1999 |
| RU | 2221335 | 1/2004 |
| RU | 2267225 | 5/2005 |
| TW | 545074 | 8/2003 |
| TW | 589818 | 6/2004 |
| TW | 200611519 | 4/2006 |
| WO | 03/043245 | 5/2003 |
| WO | 03/077579 | 9/2003 |
| WO | 03/085858 | 10/2003 |
| WO | 2004/038991 | 5/2004 |
| WO | 2004/049591 | 6/2004 |
| WO | 2005/006250 | 1/2005 |
| WO | 2005/050875 | 6/2005 |
| WO | 2005/060132 | 6/2005 |
| WO | 2005/065062 | 7/2005 |
| WO | 2005/074184 | 8/2005 |
| WO | 2005/088869 | 9/2005 |
| WO | 2005/099123 | 10/2005 |
| WO | 2005/125140 | 12/2005 |
| WO | 2005119959 | 12/2005 |
| WO | 2006/023192 | 3/2006 |
| WO | 2006/069299 | 6/2006 |
| WO | 2006/073284 | 7/2006 |
| WO | 2006071050 | 7/2006 |
| WO | 2006/102771 | 10/2006 |
| WO | 2007/011180 | 1/2007 |
| WO | 2007007380 | 1/2007 |
| WO | 2007/049208 | 5/2007 |
| WO | 2007/052941 | 5/2007 |
| WO | 2007/078146 | 7/2007 |
| WO | 2008041819 | 4/2008 |
| WO | 2008/133439 | 11/2008 |
| WO | WO 2008133439 A1 * | 11/2008 |

(56) References Cited

FOREIGN PATENT DOCUMENTS

| WO | 2008/153331 | 12/2008 |
|---|---|---|
| WO | 2009/041785 | 4/2009 |

OTHER PUBLICATIONS

Kaiser, "Space Frequency Block Coding in the Uplink of Broadband MC-CDMA Mobile Radio Systems with Pre-Equalization", Institute of Electrical and Electronics Engineers, Vehicular Technology Conference, Fall 2003, XP10701084.
Texas Instruments, "Shared Control Channel Structure and Coding for E-UTRA Downlink", 3GPP TSG RAN WG1 LTE Ad Hoc, R1-061740, Jun. 2006.
LG Electronics, "Downlink Cat0 signaling for scheduling assignments", 3GPP TSG RAN WG1 #47bis, R1-070247, Jan. 2007.
Zhang, W., et al., "Universal Space-Frequency Block Coding for MIMO-OFDM Systems", IEEE Asia-Pacific Conference on Communications, pp. 227-231, Oct. 5, 2005.
Zhang, M., et al., "Space-Frequency Block Code with Matched Rotation MIMO-OFDM System with Limited Feedback", EURASIP Journal on Advances in Signal Processing, Jun. 24, 2009.
Ryu, H.G., "System Design and Analysis of MIMO SFBC CI-OFDM System against the Nonlinear Distortion and Narrowband Interference," IEEE Transactions on Consumer Electronics, vol. 54, No. 2, pp. 368-375, May 2008.
Ryu, H.G., "Design and Performance Evaluation of the MIMO SFBC CI-OFDM Communication System," The Fourth International Conference on Wireless and Mobile Communications, pp. 60-64, Aug. 2008.
Panasonic, "Mapping Positions of Control Channel for Uplink SC-FDMA", TSG-RAN WG1 #43, Doc. No. R1-051395, XP-002450961, Nov. 7, 2005.
3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007.
Su, W., et al., "Obtaining full-diversity space-frequency codes from space-time codes via mapping," IEEE Transactions on Signal Processing, vol. 51, No. 11, pp. 2903-2916, Nov. 1, 2003; XP-011102805.
Samsung, "Transmit Diversity for 4-Tx Antenna", 3GPP TSG RAN WG1 Meeting #49, R1-072238, May 7, 2007, XP-002578959.
Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.
Kim, I.G., et al., "Transmit Diversity and Multiplexing Methods for 3G-LTE Downlink Control Channels," 64th IEEE Vehicular Technology Conference, Sep. 2006, XP-031051218.
Samsung, "Downlink ACK/NACK Transmission Structure", R1-072247, 3GPP TSG RAN WG1 Meeting #49, May 2007.
LG Electronics, "Downlink ACK/NACK Index Mapping", R1-071552, 3GPP RAN WG1 #48-BIS, Mar. 2007, XP-002660818.
Qualcomm Europe, "Considerations on Multiplexing of Control and User Data for xFDMA based E-UTRA Uplink Evaluation", R1-051102, 3GPP TSG-RAN WG1 #42bis, Oct. 2005, XP-002446638.
LG Electronics, "Uplink ACK/NACK Index Mapping", R1-071547, 3GPP RAN WG1 #48-BIS, Mar. 2007, XP-002660822.
Panasonic, "Assignment of Downlink ACK/NACK channel", R1-072794, 3GPP TSG-RAN WG1 Meeting #49bis, Jun. 2007, XP-002660823.
NTT DoCoMo et al., "Comparison between RB-level and Sub-carrier-level Distributed Transmission for Shared Data Channel in E-UTRA Downlink", R1-062089, 3GPP TSG RAN WG1 Meeting #46, Sep. 2006.
NTT DoCoMo et al., "Downlink L1/L2 Control Signaling Channel Structure Mapping," R1-070104, 3GPP TSG RAN WG Meeting #47bis, Jan. 2007.
Ericsson et al., "Way Forward on Downlink Control Signaling," R1-071223, 3GPP TSG RAN WG1 Meeting #48, Feb. 2007.
NEC Group, "Efficient Downlink ACK/NACK signalling for E-UTRA," R1-071508, TSG-RAN WG1#48Bis, Mar. 2007.
Huawei, "E-UTRA Downlink L1/L2 Control Channel Structure," R1-071689, 3GPP TSG-RAN-WG1 Meeting #48bis, Mar. 2007.
Nortel, "SCH Search Performance with Transmit Diversity", R1-061843, 3GPP TSG-RAN Working Group 1 Meeting on LTE, Jun. 2006.
Samsung, "Performance of 4-Tx Antenna diversity with realistic channel estimation", R1-072239, 3GPP TSG RAN WG1 Meeting #49, May 2007.
Morimoto et al., "Transmit Diversity Schemes Suitable for Common Control Channel in Evolved UTRA Downlink", RCS2007-50, IEICE Technical Report, pp. 125-130, Jul. 2007.
NTT DoCoMo et al., "Coding Scheme of L1/L2 Control Channel for E-UTRA Downlink", R1-061672, 3GPP TSG RAN WG1 LTE Ad Hoc, Jun. 2006.
Sharp, "UE Identity in L1/L2 Downlink Control Signalling", R1-061136, 3GPP TSG-RAN WG1#45, May 2006.
LG Electronics, "Downlink control signaling", R1-063177, 3GPP TSG RAN WG1 #47, Nov. 2006.
United States Patent and Trademark Office U.S. Appl. No. 13/295,884, Office Action dated Mar. 14, 2013, 8 pages.
United States Patent and Trademark Office U.S. Appl. No. 13/165,711, Office Action dated Mar. 13, 2013, 10 pages.
United States Patent and Trademark Office U.S. Appl. No. 13/014,665, Office Action dated Nov. 29, 2012, 24 pages.
United States Patent and Trademark Office U.S. Appl. No. 13/014,665, Final Office Action dated May 22, 2013, 25 pages.
LG Electronics, "DL ACK/NACK structure", R1-072878, 3GPP TSG RAN WG1 #49bis, Jun. 2007.
Intel Corporation: "Text Proposal for downlink OFDMA resource allocation and mapping rules for distributed mode users in E-UTRA, with discussion on control information", R1-061149, 3GPP TSG RAN WG1 #45, May 2006, XP002486595.
ETRI: "Downlink L1/L2 control signalling", R1-070079, 3GPP TSG RAN WG1 Meeting #47bis, Jan. 2007, XP050104134.
Qualcomm Europe, Mapping of UL ACK Transmission based on DL VRB, R1-070660, 3GPP TSG RAN WG1 #48, Feb. 12, 2007.
Nortel, Discussion on linkage of PHICH to uplink transmissions, R1-080771, 3GPP TSG-RAN WG1 #52, Feb. 11, 2007.
NTT DoCoMo et al., "RB-level Distributed Transmission Method for Shared Data Channel in E-UTRA Downlink", R1-062285, 3GPP TSG-RAN WG1#46, Aug.-Sep. 2006.
Texas Instruments, "Shared Control Channel Structure and Coding for E-UTRA Downlink", R1-061433, 3GPP TSG-RAN WG1#45, May 2006.
United States Patent and Trademark Office U.S. Appl. No. 13/295,987, Office Action dated Feb. 6, 2013, 8 pages.
United States Patent and Trademark Office U.S. Appl. No. 13/295,974, Office Action dated Jan. 29, 2013, 8 pages.
United States Patent and Trademark Office U.S. Appl. No. 13/217,204, Notice of Allowance dated Apr. 8, 2013, 8 pages.
United States Patent and Trademark Office U.S. Appl. No. 13/165,711, Final Office Action dated Aug. 9, 2013, 9 pages.
United States Patent and Trademark Office U.S. Appl. No. 13/941,277, Notice of Allowance dated Jan. 21, 2014, 9 pages.
European Patent Office Application Serial No. 13185491.1, Search Report dated Nov. 7, 2013, 8 pages.
United States Patent and Trademark Office U.S. Appl. No. 13/014,665, Office Action dated Feb. 13, 2014, 18 pages.
LG Electronics, "Downlink resource allocation for localized and distributed transmission," R1-071549, 3GPP TSG RAN WG1 #48bis, Mar. 2007, XP-050105480.
NTT DoCoMo, et al., "ACK/NACK Signal Structure in E-UTRA Downlink," 3GPP TSG RAN WG1 Meeting #48, R1-070867, Feb. 2007, 3 pages.
LG Electronics, "Allocation of UL ACK/NACK index," 3GPP TSG RAN WG1 #49, R1-072348, May 2007, 4 pages.

(56) References Cited

OTHER PUBLICATIONS

European Patent Office Application Serial No. 14152103.9, Search Report dated Mar. 6, 2014, 7 pages.
Motorola, "E-UTRA Downlink Control Channel Structure and TP," 3GPP TSG RAN1 #44, R1-060378, Feb. 2006, 7 pages.
Ericsson, et al., "DL Control Channel Structure," 3GPP Draft, R1-071820, Apr. 2007, 3 pages.
Panasonic, "CCE aggregation size and transport format signaling," 3GPP TSG-RAN WG1 Meeting #50, R1-073608, Aug. 2007, 8 pages.
LG Electronics, "Consideration on the amount of control channel overhead in downlink," 3GPP TSG RAN WG1 #49, R1-072353, May 2007, 5 pages.
Motorola, "Downlink Acknowledgment and Group Transmit Indicator Channels," 3GPP TSG RAN1 #45, R1-061165, May 2006, 4 pages.
Samsung, "DL ACK/NACK signalling," 3GPP RAN WG1 LTE Ad Hoc, R1-061697, Jun. 2006, 5 pages.
Via Telecom, "Hybrid CDM/TDM Structure for UL E-DCH," 3GPP TSG-RAN WG1 #38-bis, R1-041162, Sep. 2004, 3 pages.
European Patent Office Application Serial No. 07833138.6, Search Report dated Feb. 21, 2014, 10 pages.
European Patent Office Application Serial No. 07833139.4, Search Report dated Mar. 4, 2014, 7 pages.
Samsung, "Rules for mapping VRBs to PRBs," 3GPP RAN WG1 Meeting #44bis, R1-060808, Mar. 2006, 5 pages.
Ericsson, et al., "E-UTRA Downlink Control Signaling—Overhead Assessment," TSG-RAN WG1 #44, R1-060573, Feb. 2006, 7 pages.

* cited by examiner

FIG. 1

| | | | | | | | | | frequency → |
|---|---|---|---|---|---|---|---|---|---|
| Ant.1 | $f_1(a)$ | $f_2(b)$ | | | $f_1(e)$ | $f_2(f)$ | | | |
| Ant.2 | $f_3(b)$ | $f_4(a)$ | | | $f_3(f)$ | $f_4(e)$ | | | |
| Ant.3 | | | $f_1(c)$ | $f_2(d)$ | | | $f_1(g)$ | $f_2(h)$ | · · · · |
| Ant.4 | | | $f_3(d)$ | $f_4(c)$ | | | $f_3(h)$ | $f_4(g)$ | |

FIG. 2

| | | | | | | | | | frequency → |
|---|---|---|---|---|---|---|---|---|---|
| Ant.1 | $f_1(a_1+b_1+c_1+d_1)$ | $f_2(a_2+b_2+c_2+d_2)$ | | | $f_1(e_1+f_1+g_1+h_1)$ | $f_2(e_2+f_2+g_2+h_2)$ | | | |
| Ant.2 | $f_3(a_2+b_2+c_2+d_2)$ | $f_4(a_1+b_1+c_1+d_1)$ | | | $f_3(e_2+f_2+g_2+h_2)$ | $f_4(e_1+f_1+g_1+h_1)$ | | | |
| Ant.3 | | | $f_1(a_3+b_3+c_3+d_3)$ | $f_2(a_4+b_4+c_4+d_4)$ | | | | $f_1(e_3+f_3+g_3+h_3)$ | $f_2(e_4+f_4+g_4+h_4)$ |
| Ant.4 | | | $f_3(a_4+b_4+c_4+d_4)$ | $f_4(a_3+b_3+c_3+d_3)$ | | | | $f_3(e_4+f_4+g_4+h_4)$ | $f_4(e_3+f_3+g_3+h_3)$ |

| | | | | | | | | | |
|---|---|---|---|---|---|---|---|---|---|
| Ant. 1 | $f_1(a_1+b_1)$ | | $f_1(c_1+d_1)$ | | | $f_1(e_1+f_1)$ | | $f_1(g_1+h_1)$ | |
| Ant. 2 | $f_2(a_2+b_2)$ | | $f_2(c_2+d_2)$ | | | $f_2(e_2+f_2)$ | | $f_2(g_2+h_2)$ | |
| Ant. 3 | $f_3(a_1+b_2)$ | | $f_3(c_1+d_2)$ | | | $f_3(e_1+f_2)$ | | $f_3(g_1+h_2)$ | |
| Ant. 4 | $f_4(a_2+b_1)$ | | $f_4(c_2+d_1)$ | | | $f_4(e_2+f_1)$ | | $f_4(g_2+h_1)$ | | frequency →

(b)

| | | | | | | | | | |
|---|---|---|---|---|---|---|---|---|---|
| Ant. 1 | $f_1(a_1+b_1)$ | | $f_1(a_1+b_1)$ | | | $f_1(c_1+d_1)$ | | $f_1(c_1+d_1)$ | |
| Ant. 2 | $f_2(a_2+b_2)$ | | $f_2(a_2+b_2)$ | | | $f_2(c_2+d_2)$ | | $f_2(c_2+d_2)$ | |
| Ant. 3 | $f_3(a_1+b_2)$ | | $f_3(a_1+b_2)$ | | | $f_3(c_1+d_2)$ | | $f_3(c_1+d_2)$ | |
| Ant. 4 | $f_4(a_2+b_1)$ | | $f_4(a_2+b_1)$ | | | $f_4(c_2+d_1)$ | | $f_4(c_2+d_1)$ | | frequency →

| | | | | | | | |
|---|---|---|---|---|---|---|---|
| Ant. 1 | $f_1(a_1+b_1)$ | | $f_1(c_1+d_2)$ | $f_1(e_1+f_1)$ | | $f_1(g_1+h_1)$ | |
| Ant. 2 | $f_2(a_2+b_2)$ | | $f_2(c_2+d_2)$ | $f_2(e_2+f_2)$ | | $f_2(g_2+h_2)$ | |
| Ant. 3 | $f_3(a_2+b_2)$ | | $f_3(c_2+d_1)$ | | $f_3(e_2+f_1)$ | | $f_3(g_2+h_1)$ |
| Ant. 4 | $f_4(a_1+b_1)$ | | $f_4(c_1+d_1)$ | | $f_4(e_1+f_2)$ | | $f_4(g_1+h_1)$ | frequency →

(b)

| | | | | | | | |
|---|---|---|---|---|---|---|---|
| Ant. 1 | $f_1(a_1+b_1)$ | | $f_1(a_1+b_1)$ | $f_1(c_1+d_1)$ | | $f_1(c_1+d_1)$ | |
| Ant. 2 | $f_2(a_2+b_1)$ | | $f_2(a_2+b_2)$ | $f_2(c_2+d_1)$ | | $f_2(c_2+d_2)$ | |
| Ant. 3 | $f_3(a_2+b_2)$ | | $f_3(a_2+b_1)$ | | $f_3(c_2+d_2)$ | | $f_3(c_2+d_1)$ |
| Ant. 4 | $f_4(a_1+b_2)$ | | $f_4(a_1+b_1)$ | | $f_4(c_1+d_2)$ | | $f_4(c_1+d_1)$ | frequency →

TRANSMITTING SPREAD SIGNAL IN COMMUNICATION SYSTEM

CROSS-REFERENCE TO RELATED APPLICATIONS

This application is a continuation of U.S. patent application Ser. No. 12/139,254, filed on Jun. 13, 2008, now U.S. Pat. No. 7,953,169, which claims the benefit of earlier filing date and right of priority to Korean Patent Application No. 10-2007-122986, filed on Nov. 29, 2007, and also claims the benefit of U.S. Provisional Application Ser. Nos. 60/943,783, filed on Jun. 13, 2007, 60/955,019, filed on Aug. 9, 2007, 60/976,487, filed on Oct. 1, 2007, 60/982,435, filed on Oct. 25, 2007, and 60/983,234, filed on Oct. 29, 2007, the contents of which are all hereby incorporated by reference herein in their entirety.

BACKGROUND OF THE INVENTION

1. Field of the Invention

The present invention relates to a communication system, and more particularly, to transmitting a spread signal in a communication system.

2. Discussion of the Related Art

Recently, the demand for wireless communication services has risen abruptly due to the generalization of information communication services, the advent of various multimedia services and the appearance of high-quality services. To actively cope with the demand, a communication system's capacity should first be increased. In order to do so, methods for finding new available frequency bands and raising the efficiency of given resources in wireless communication environments are considered.

Much effort and attention has been made to research and develop multiantenna technology. Here, diversity gain is obtained by additionally securing a spatial area for resource utilization with a plurality of antennas provided to a transceiver or raising transmission capacity by transmitting data in parallel via each antenna.

An example of a multi-antenna technology is a multiple input multiple output (MIMO) scheme. The MIMO scheme indicates an antenna system having multiple inputs and outputs, raises a quantity of information by transmitting different information via each transmitting antenna, and enhances reliability of transport information using coding schemes such as STC (space-time coding), STBC (space-time block coding), SFBC (space-frequency block coding) and the like.

SUMMARY OF THE INVENTION

The present invention is directed to transmitting a spread signal in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting a spread signal in a mobile communication system, the method comprising spreading a signal using a plurality of spreading codes, wherein the plurality of spreading codes have a spreading factor, multiplexing the spread signal by code division multiplexing, transmitting the multiplexed signal via a plurality of neighboring frequency resources of one OFDM symbol of a first antenna set, and transmitting the same multiplexed signal via a plurality of neighboring frequency resources of one OFDM symbol of a second antenna set.

Preferably, the multiplexed signal is transmitted on four neighboring frequency resources. Preferably, the spreading factor is 4. Alternatively, the spreading factor is equal to the number of neighboring frequency resources.

In one aspect of the present invention, the first antenna set is space frequency block coded by applying a space frequency block code to each neighboring pair of frequency resources of one OFDM symbol, wherein the first antenna set comprises two antennas. Moreover, the second antenna set is space frequency block coded by applying a space frequency block code to each neighboring pair of frequency resources of one OFDM symbol, wherein the second antenna set comprises two antennas.

Preferably, the multiplexed signal transmitted via the first antenna set and the multiplexed signal transmitted via the second antenna set are transmitted via respectively different frequency resources. Preferably, the multiplexed signal transmitted via the first antenna set and the multiplexed signal transmitted via the second antenna set are transmitted via respectively different OFDM symbols.

In another aspect of the present invention, the multiplexed signal is transmitted alternately by the first antenna set and second antenna set via independent frequency resources repeatedly. Preferably, the multiplexed signal is transmitted a total of 3 times using the first antenna set and second antenna set alternately.

In one aspect of the present invention, the first antenna set comprises a first antenna and a second antenna of a four-antenna group, and the second antenna set comprises a third antenna and a fourth antenna of the four-antenna group.

In another aspect of the present invention, the first antenna set comprises a first antenna and a third antenna of a four-antenna group, and the second antenna set comprises a second antenna and a fourth antenna of the four-antenna group.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 1 is a diagram illustrating an example of a method for applying an SFBC/FSTD scheme in a communication system in accordance with one embodiment of the present invention.

FIG. 2 is a diagram illustrating an example of a method for applying an SFBC/FSTD scheme to a spread signal in a communication system in accordance with one embodiment of the present invention.

FIG. 3 is a diagram illustrating an example of a method for applying an SFBC/FSTD scheme to a spread signal in a communication system in accordance with one embodiment of the present invention.

FIG. 4 is a diagram illustrating another example of a method for applying an SFBC/FSTD scheme to a spread signal in a communication system in accordance with one embodiment of the present invention.

FIG. 9 is a diagram illustrating an example of a method for applying an SFBC/FSTD scheme to a spread signal in a communication system in accordance with one embodiment of the present invention.

FIG. 10 is a diagram illustrating another example of a method for applying an SFBC/FSTD scheme to a spread signal in a communication system in accordance with one embodiment of the present invention.

DETAILED DESCRIPTION OF THE PREFERRED EMBODIMENTS

Figure 5:
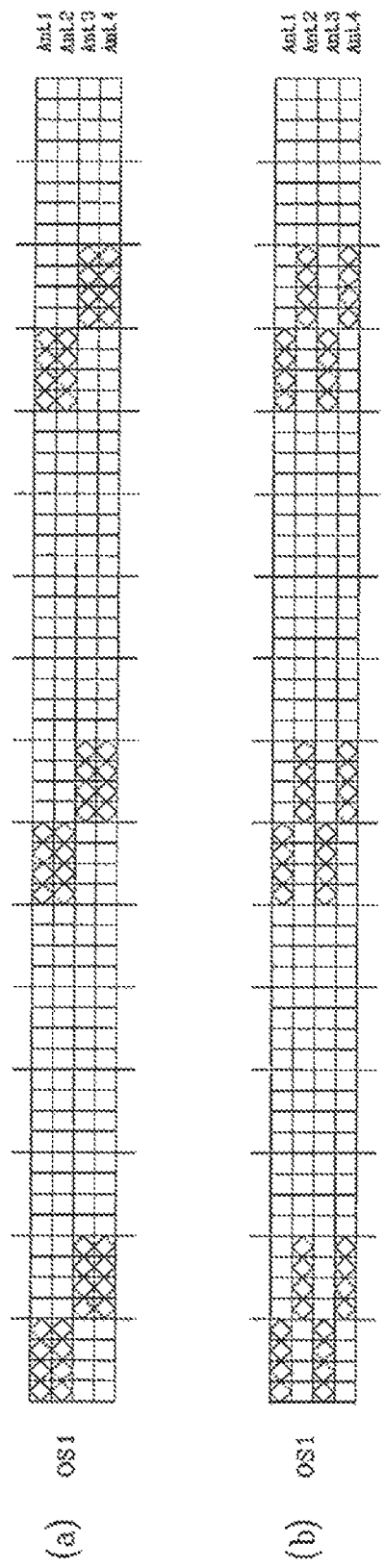
FIG. 5 is a diagram illustrating an example of a method for applying an SFBC/FSTD scheme to a spread signal in a communication system in accordance with one embodiment of the present invention.

The present invention relates to transmitting a spread signal in a wireless communication system.

Reference will now be made in detail to the preferred embodiments of the present invention, examples of which are illustrated in the accompanying drawings. It is to be understood that the following detailed description of the present invention is exemplary and explanatory and is intended to provide further explanation of the invention as claimed. The following detailed description includes details to provide complete understanding of the present invention. Yet, it is apparent to those skilled in the art that the present invention can be embodied without those details. For instance, predetermined terminologies are mainly used for the following description, need not to be limited, and may have the same meaning in case of being called arbitrary terminologies.

To avoid vagueness of the present invention, the structures or devices known in public are omitted or depicted as a block diagram and/or flowchart focused on core functions of the structures or devices. Wherever possible, the same reference numbers will be used throughout the drawings to refer to the same or like parts.

For the following embodiments, elements and features of the present invention are combined in prescribed forms. Each of the elements or features should be considered as selective unless there is separate and explicit mention. Each of the elements or features can be implemented without being combined with others. And, it is able to construct an embodiment of the present invention by combining partial elements and/or features of the present invention. The order of operations explained in the following embodiments of the present invention can be changed. Some partial configurations or features of a prescribed embodiment can be included in another embodiment and/or may be replaced by corresponding configurations or features of another embodiment.

In this disclosure, embodiments of the present invention are described mainly with reference to data transmitting and receiving relations between a base station and a terminal. In this case, the base station has a meaning of a terminal node of a network, which directly performs communication with the terminal. In this disclosure, a specific operation described as performed by a base station can be carried out by an upper node of the base station. Namely, it is understood that various operations carried out by a network, which includes a plurality of network nodes including a base station, for the communication with a terminal can be carried out by the base station or other network nodes except the base station. "Base station" can be replaced by such a terminology as a fixed station, Node B, eNode B (eNB), access point and the like. And, "terminal" can be replaced by such a terminology as UE (user equipment), MS (mobile station), MSS (mobile subscriber station) and the like.

FIG. 1 is a diagram illustrating an example of a method of applying an SFBC/FSTD scheme in a wireless communication system, in accordance with one embodiment of the present invention. In FIG. 1, a method for obtaining 4-degree transmitting antenna diversity is implemented using a plurality of transmitting antennas, e.g., four downlink transmitting antennas of a communication system. Here, two modulation signals transmitted via two adjacent subcarriers are transmitted via a first antenna set including two antennas by having space frequency block coding (SFBC) applied thereto. Two SFBC-coded subcarrier sets are transmitted via two different antenna sets each including two different antennas by having frequency switching transmit diversity (FSTD) applied thereto. As a result, a transmitting antenna diversity degree 4 can be obtained.

Referring to FIG. 1, a single small box indicates a single subcarrier transmitted via a single antenna. The letters "a", "b", "c" and "d" represent modulation symbols modulated into signals differing from each other. Moreover, functions $f_1(x)$, $f_2(x)$, $f_3(x)$ and $f_4(x)$ indicate random SFBC functions that are applied to maintain orthogonality between two signals. These functions can be represented as in Equation 1.

$$f_1(x)=x,\ f_2(x)=x,\ f_3(x)=-x^*,\ f_4(x)=x^* \qquad \text{[Equation 1]}$$

Despite two signals being simultaneously transmitted via two antennas through the random SFBC function applied to maintain orthogonality between the two signals, a receiving side may be able to obtain an original signal by decoding each of the two signals. In particular, FIG. 1 shows a structure that SFBC and FSTD transmitted in downlink within a random time unit is repeated. By applying a simple reception algorithm that the same SFBC decoding and FSTD decoding are repeated in a receiving side through the structure of SFBC and FSTD repeating transmissions, decoding complexity is reduced and decoding efficiency is raised.

In the example shown in FIG. 1, modulated symbol sets (a, b), (c, d), (e, f) and (g, h) become an SFBC-coded set, respectively. FIG. 1 shows that subcarriers having SFBC/FSTD applied thereto are consecutive. However, the subcarriers having SFBC/FSTD applied thereto may not necessarily be consecutive in a frequency domain. For instance, a subcarrier carrying a pilot signal can exist between SFBC/FSTD applied subcarriers. Yet, two subcarriers constructing an SFBC coded set are preferably adjacent to each other in a frequency domain so that wireless channel environments covered by a single antenna for two subcarriers can become similar to each other. Hence, when SFBC decoding is performed by a receiving side, it is able to minimize interference mutually affecting the two signals.

In accordance with one embodiment of the present invention, an SFBC/FSTD scheme may be applied to a spread signal sequence. In a manner of spreading a single signal into a plurality of subcarriers through (pseudo) orthogonal code in a downlink transmission, a plurality of spread signals may be transmitted by a code division multiplexing (CDM) scheme.

For example, when attempting to transmit different signals "a" and "b", if the two signals are to be CDM-transmitted by being spread by a spreading factor (SF) 2, the signal a and the signal b are transformed into spread signal sequences (a·$c_{11}$, a·$c_{21}$) and (b·$c_{12}$, b$c_{22}$) using (pseudo) orthogonal spreading codes of two chip lengths ($c_{11}$, $c_{21}$) and ($c_{12}$, $c_{22}$), respectively. The spread signal sequences are modulated by adding a·$c_{11}$+b·$c_{12}$ and a·$c_{21}$+b$c_{22}$ to two subcarriers, respectively. Namely, a·$c_{11}$+b·$c_{12}$ and a·$c_{21}$+b$c_{22}$ become modulated symbols, respectively. For clarity and convenience, the spread signal sequence resulting from spreading the signal a by SF=N is denoted as $a_1, a_2, \ldots, a_N$.

FIG. 2 is a diagram illustrating an example of a method of applying an SFBC/FSTD scheme to a spread signal in a communication system, in accordance with one embodiment of the present invention. In order to decode a signal spread over a plurality of subcarriers by despreading in a receiving side, as mentioned in the foregoing description, it is preferable that each chip of a received spread signal sequence undergo a similar wireless channel response. In FIG. 2, four different signals a, b, c and d are spread by SF=4 and the spread signals are transmitted by SFBC/FSTD through four subcarriers explained in the foregoing description of FIG. 1. Assuming that the function explained for the example in Equation 1 is used as an SFBC function, a received signal in each subcarrier can be represented as in Equation 2.

Subcarrier 1: $h_1(a_1+b_1+c_1+d_1) - h_2(a_2+b_2+c_2+d_2)^*$

Subcarrier 2: $h_1(a_2+b_2+c_2+d_2) + h_2(a_1+b_1+c_1+d_1)^*$

Subcarrier 3: $h_3(a_3+b_3+c_3+d_3) - h_4(a_4+b_4+c_4+d_4)^*$

Subcarrier 4: $h_3(a_4+b_4+c_4+d_4) + h_4(a_3+b_3+c_3+d_3)^*$ [Equation 2]

In Equation 2, $h_i$ indicates fading undergone by an $i^{th}$ antenna. Preferably, subcarriers of the same antenna undergo the same fading. A noise component added to a receiving side may be ignored. And, a single receiving antenna preferably exists. In this case, spread sequences obtained by a receiving side after completion of SFBC decoding and FSTD decoding can be represented as in Equation 3.

$(|h_1|^2+|h_2|^2)\cdot(a_1+b_1+c_1+d_1),$ $(|h_1|^2+|h_2|^2)\cdot(a_2+b_2+c_2+d_2),$ $(|h_3|^2+|h_4|^2)\cdot(a_3+b_3+c_3+d_3),$ $(|h_3|^2+|h_4|^2)\cdot(a_4+b_4+c_4+d_4),$ [Equation 3]

Here, in order to separate the spread sequence obtained by the receiving side from the signals b, c and d by despreading with a (pseudo) orthogonal code corresponding to the signal a for example, the wireless channel responses for the four chips is preferably the same. However, as can be observed from Equation 3, signals transmitted via different antenna sets by FSTD are $(|h_1|^2+|h_2|^2)$ and $(|h_3|^2+|h_4|^2)$ and provide results through different wireless channel responses, respectively. Thus, complete elimination of a different CDM-multiplexed signal during dispreading is not performed.

Figure 3:
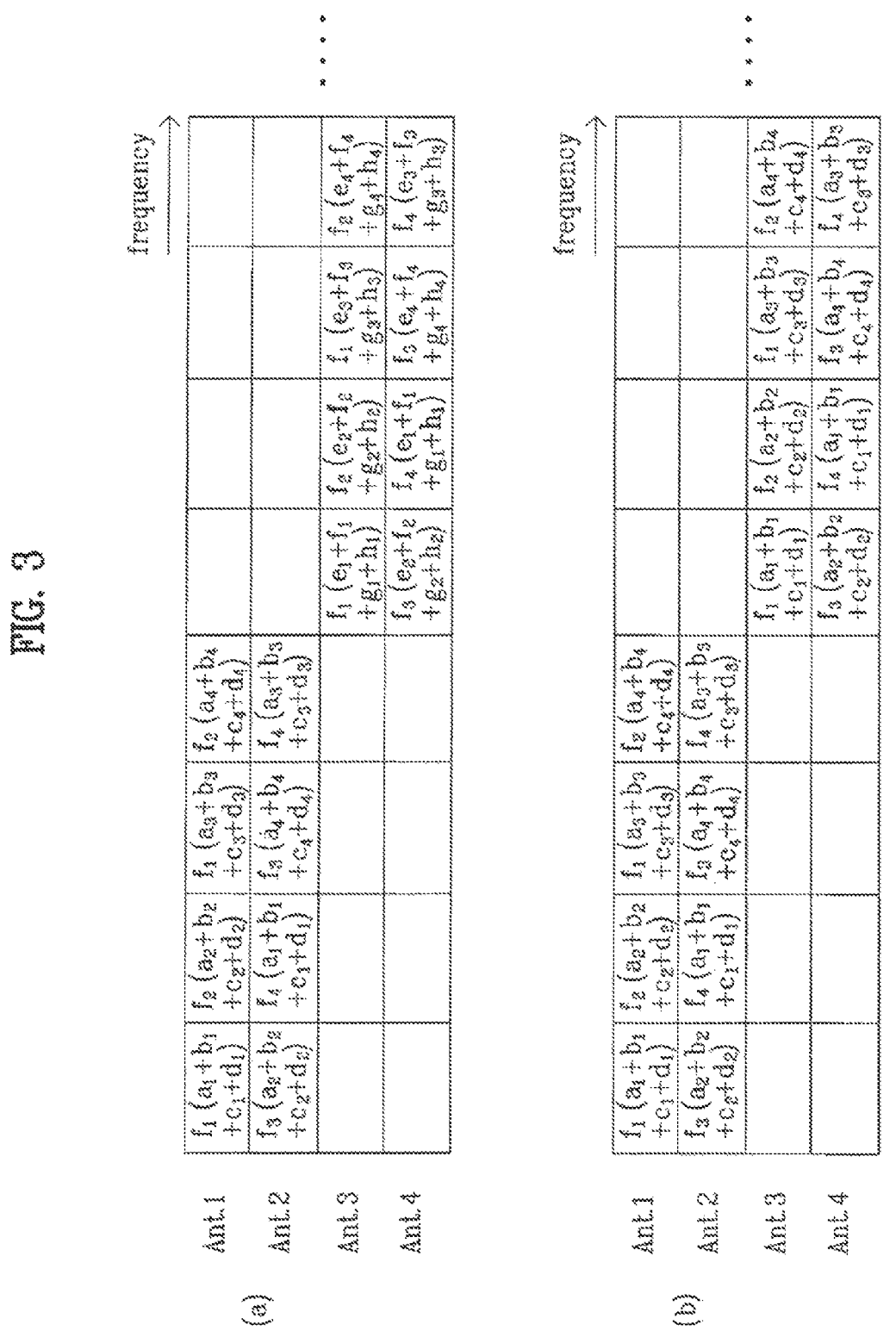

Therefore, one embodiment of the present invention is directed to a method of transmitting at least one spread signal in a communication system, wherein each of at least one signal is spread by (pseudo) orthogonal code or the like with a spreading factor (SF), and wherein the at least one spread signal is multiplexed by CDM and transmitted via the same antenna set. FIG. 3 is a diagram illustrating an example for a method of applying an SFBC/FSTD scheme to a spread signal in a communication system in accordance with one embodiment of the present invention. In the present embodiment, each of at least one signal is spread by (pseudo) orthogonal code or the like with SF=4. Furthermore, the at least one spread signal is multiplexed and transmitted by CDM, and the multiplexed signals are transmitted via the same antenna set.

In FIG. 3, when a total of four transmitting antennas are used, a first antenna set includes a first antenna and a second antenna. A second antenna set includes a third antenna and a fourth antenna. In particular, each of the first and second antenna sets is the antenna set for performing SFBC coding, and an FSTD scheme is applicable between the two antenna sets. According to the present embodiment, assuming that data to be transmitted is carried by a single OFDM symbol, the signal spread with SF=4, as shown in FIG. 3, can be transmitted via four neighbor subcarriers of one OFDM symbol via the same SFBC-coded antenna set.

In FIG. 3(a), shown is a case where the spread signal transmitted via the first antenna set is different from the spread signal transmitted via the second antenna set. In FIG. 3(b), shown is a case where the spread signal transmitted via the first antenna set is repeatedly transmitted via the second antenna set to obtain a 4-degree transmitting antenna diversity gain.

Figure 4:
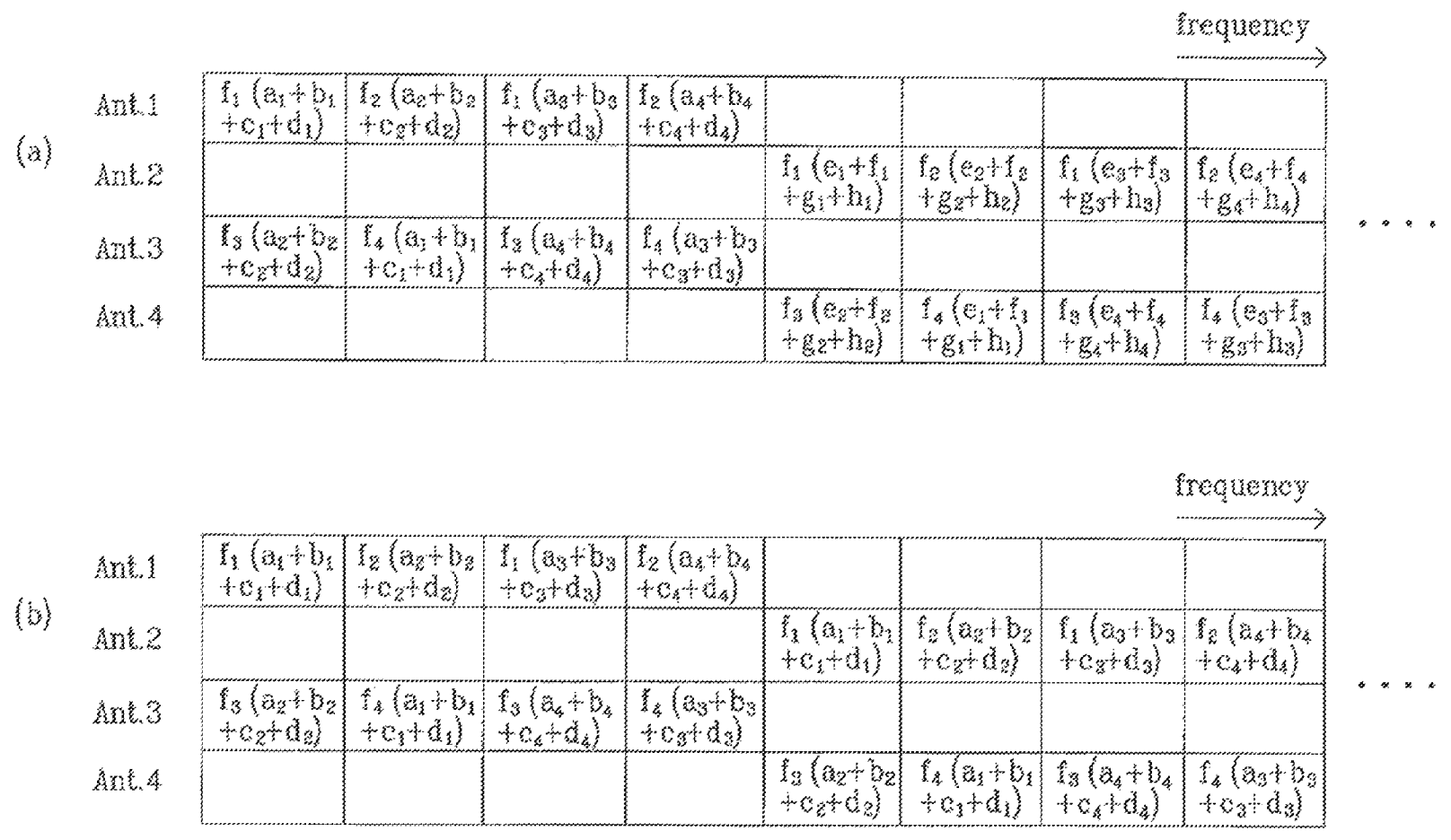

FIG. 4 is a diagram illustrating another example for a method of applying an SFBC/FSTD scheme to a spread signal in a communication system in accordance with one embodiment of the present invention. In the present embodiment, like the former embodiment shown in FIG. 3, each of at least one signal is spread by (pseudo) orthogonal code or the like with SF=4. The at least one spread signal is multiplexed and transmitted by CDM, and the multiplexed signals are transmitted via the same antenna set.

In FIG. 4, unlike FIG. 3, when a total of four transmitting antennas are used, a first antenna set includes a first antenna and a third antenna. A second antenna set includes a second antenna and a fourth antenna. Namely, compared to FIG. 3, FIG. 4 shows a case of using a different method for constructing each antenna set but applying the same SFBC/FSTD scheme. Here, according to the present embodiment, the signal spread with SF=4 can be transmitted via four neighbor subcarriers of one OFDM symbol via the same SFBC-coded antenna set.

In FIG. 4(a), shown is a case where the spread signal transmitted via the first antenna set is different from the spread signal transmitted via the second antenna set. In FIG. 4(b), shown is a case where the spread signal transmitted via the first antenna set is repeatedly transmitted via the second antenna set to obtain a 4-degree transmitting antenna diversity gain.

FIG. 5 is a diagram illustrating an example of a method for applying an SFBC/FSTD scheme to a spread signal in a communication system in accordance with an embodiment of the present invention. Preferably, a same signal can be repeatedly transmitted to obtain additional diversity. Accordingly, the present embodiment relates to a case where the same signal is repeatedly transmitted at least twice via different subcarriers on a frequency axis, i.e., for a period of the same time unit.

In the present embodiment, an antenna set is determined as follows. First, after a signal has been spread with SF=4, an antenna set is determined by a 4-subcarrier unit to enable the signal spread according to the aforesaid embodiment to be transmitted via the same antenna set. In this case, as mentioned in the foregoing description, the signal is repeatedly transmitted by changing an antenna set in case of repetitive transmission to apply the SFBC/FSTD scheme for obtaining 4-degree transmitting antenna diversity. According to the present embodiment, an antenna-frequency mapping structure, to which the SFBC/FSTD scheme for obtaining 4-degree transmitting antenna diversity gain is applied, may be repeated by an 8-subcarrier unit.

In FIG. 5(a), shown is an example where the repetitive transmission method is applied to the embodiment described with reference to FIG. 3. In FIG. 5(b), shown is an example where the repetitive transmission method is applied to the embodiment described with reference to FIG. 4. In particular, FIG. 5(a) and FIG. 5(b) show examples for applying the SFBC/FSTD scheme for obtaining 4-degree transmitting antenna diversity gain using eight neighbor subcarriers, respectively. Although FIG. 5(a) and FIG. 5(b) differ from each other with respect to the antennas included in the first and second antenna sets, each use the same method in applying the present embodiment.

In accordance with the present invention, a one-time transmission may correspond to a case where a signal having been spread with SF=4 is CDM-multiplexed and then transmitted via four subcarriers. Accordingly, assuming that one-time transmission is performed via the first antenna set shown in FIG. 5(a) or 5(b), a two-time transmission, which is the repetitive transmission of the one-time transmission, can be carried out via the second antenna set. Thus, it is observed that the SFBC/FSTD scheme is implemented via the one-time transmission and the two-time transmission. In the same manner, a three-time transmission may be carried out when the first antenna set performs the transmission again.

Figure 6:
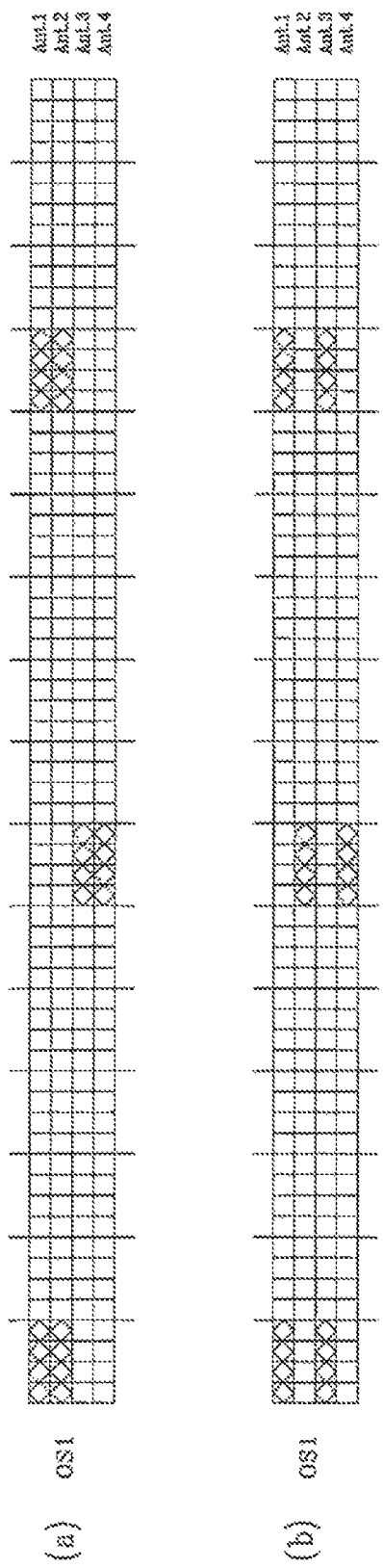
FIG. 6 is a diagram illustrating another example of a method for applying an SFBC/FSTD scheme to a spread signal in a communication system in accordance with one embodiment of the present invention.

FIG. 6 is a diagram illustrating another example for a method of applying a SFBC/FSTD scheme to a spread signal in a communication system in accordance with an embodiment of the present invention. In FIG. 6, like the embodiment shown in FIG. 5, after a signal is spread with SF=4, an antenna set is determined by a 4-subcarrier unit to enable the signal spread according to the aforesaid embodiment to be transmitted via the same antenna set. In this case, as mentioned in the foregoing description, the signal is repeatedly transmitted by changing an antenna set in case of repetitive transmission to apply SFBC/FSTD for obtaining 4-degree transmitting antenna diversity.

However, while the embodiments shown in FIG. 5 use the SFBC/FSTD scheme through eight neighbor subcarriers, the embodiment of FIG. 6 uses subcarriers having an interval compared to a previous transmission. Thus, frequency diversity may be obtained in addition to 4-degree antenna diversity. Notably, it is preferable that subcarriers through which a spread signal sequence is multiplexed and transmitted include subcarriers that neighbor each other.

This may be explained as follows. First, a one-time transmission may be performed using only four of eight subcarriers to which the SFBC/FSTD scheme is applied in the embodiment shown in FIG. 5 using a first antenna set. Subsequently, the one-time transmission is performed using four of eight subcarriers to which the SFBC/FSTD scheme is applied using a second antenna set. Accordingly, in order to implement the SFBC/FSTD scheme for obtaining 4-degree transmitting antenna diversity, an antenna set different from that of a previous transmission is used.

In FIG. 6(a), shown is an example where a repetitive transmission method is applied to the embodiment described with reference to FIG. 3. In FIG. 6(b), shown is an example where a repetitive transmission method is applied to the embodiment described with reference to FIG. 4. Although FIG. 6(a) and FIG. 6(b) differ from each other with respect to the antennas included in the first and second antenna sets, each use the same method in applying the present embodiment.

Referring to FIG. 6, compared to the method described in FIG. 5, the embodiment of FIG. 6 may considerably save resources required for the repetitive transmission by reducing additionally used resources in half. Therefore, if the repetitive transmission method according to FIG. 6 is applied, resources used for data transmission are used more efficiently.

As described above, a method of applying an SFBC/FSTD scheme for a single time unit according to an embodiment of the present invention was explained. However, situations occur where a signal may be transmitted using a plurality of time units, wherein a single OFDM symbol may be preferably defined as a time unit in a communication system adopting orthogonal frequency division multiplexing. Accordingly, in accordance with an embodiment of the present invention, a method of applying an SFBC/FSTD scheme to a case of transmitting a signal using a plurality of OFDM symbols will be explained.

When a signal is transmitted via a plurality of OFDM symbols, repetitive transmission on a time axis as well as a frequency axis is possible to obtain diversity additional to transmitting antenna diversity. Accordingly, CDM and SFBC/FSTD schemes may be applied to a spread signal for an ACK/NAK signal transmitted in downlink to announce the successful/failed reception of data transmitted in uplink.

Figure 7:
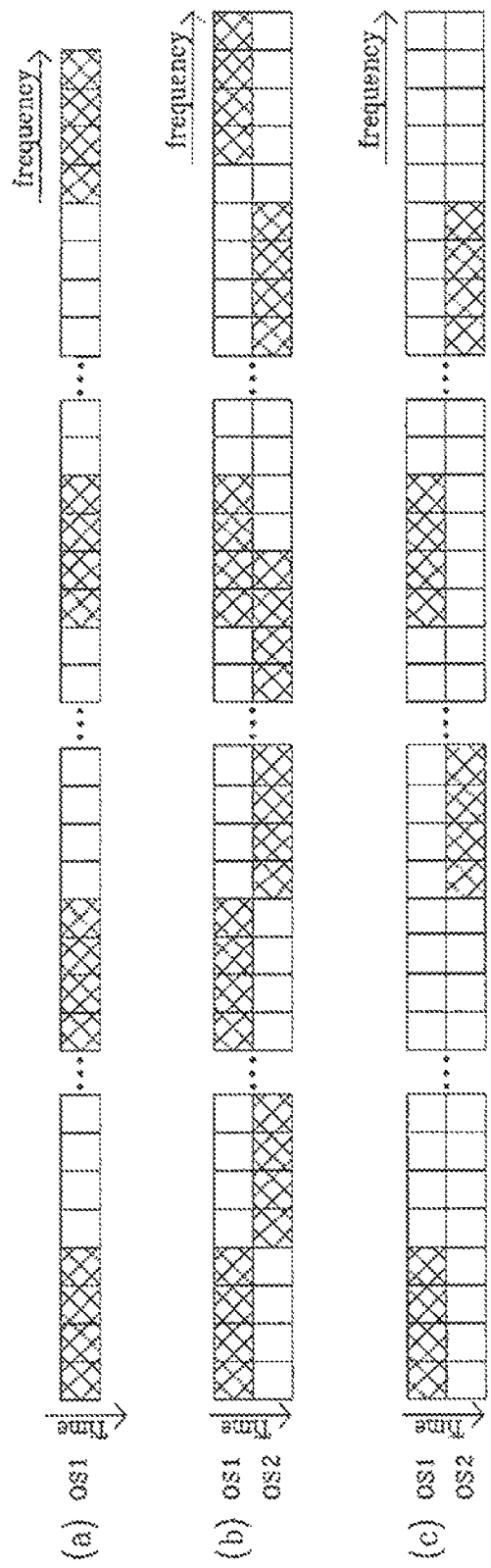
FIG. 7 is a diagram illustrating an example of a method for transmitting a spread signal via a plurality of OFDM symbols in accordance with one embodiment of the present invention.

FIG. 7 is a diagram illustrating an example of a method for transmitting a spread signal via a plurality of OFDM symbols in accordance with one embodiment of the present invention. Referring to FIG. 7, each small box indicates a resource element (RE) constructed with a single OFDM symbol and a single subcarrier. $A_{ij}$; may indicate an ACK/NAK signal multiplexed by CDM, wherein "i" indicates an index of a signal spread and then multiplexed, and "j" indicates an ACK/NAK channel index of the multiplexed ACK/NAK signal. In this case, an ACK/NAK channel indicates a set of multiplexed ACK/NAK signals. A plurality of ACK/NAK channels may exist according to necessity and resource situation of each system. However, for clarity and convenience of description, a single ACK/NAK channel exists in FIG. 7.

In FIG. 7(a), shown is an example where a multiplexed ACK/NAK signal is transmitted via a single OFDM symbol. Referring to FIG. 7(a), four ACK/NAK signals are spread by a spreading factor equal to four (SF=4) for a single OFDM symbol, multiplexed by CDM, and then transmitted via four neighbor subcarriers. Because a single OFDM symbol is used for the ACK/NAK signal transmission, diversity gain on a time axis may not be obtained. However, four repetitive transmissions of the ACK/NAK signal multiplexed by CDM may be carried out along a frequency axis. Hence, the four-time repetitive transmission exemplifies repetition to obtain diversity. Notably, a repetition count may vary according to a channel status and/or a resource status of a system.

In FIG. 7(b), shown is an example where a multiplexed ACK/NAK signal is transmitted via a plurality of OFDM symbols. Referring to FIG. 7(b), four ACK/NAK signals are spread by a spreading factor SF=4 for two OFDM symbols each, multiplexed by CDM, and then transmitted via four neighbor subcarriers. Namely, in case that OFDM symbols for ACK/NAK signal transmission increase, the ACK/NAK signal may be repetitively transmitted using a single OFDM symbol for the increased OFDM symbols as it is. However, when the ACK/NAK signal is repetitively transmitted for a second OFDM symbol, transmission is performed to maximize use of subcarriers that are not overlapped with former subcarriers used for the first OFDM symbol. This is preferable considering a frequency diversity effect.

In FIG. 7(b), shown is a case where the number of ACK/NAK signals transmittable despite the increased number of OFDM symbols is equal to the case where a single OFDM symbol is used. Previously, an ACK/NAK signal was transmitted repeatedly only on a frequency axis when using a single OFDM symbol. However, in accordance with the present embodiment, more time-frequency resources may be used for transmitting the same number of ACK/NAK signals as in the single OFDM symbol case by substantially incrementing the repetition count of time-frequency. Here, because OFDM symbols used for the ACK/NAK transmission are increased, more signal power used for the ACK/NAK transmission can be allocated. Hence, the ACK/NAK signal may be transmitted to a cell having a wider area.

In FIG. 7(c), shown is another example where multiplexed ACK/NAK signals are transmitted via a plurality of OFDM symbols. Referring to FIG. 7(c), when the number of OFDM symbols for ACK/NAK signal transmission is set at 2, the transmission may be carried out by reducing the frequency-axis repetition count of the ACK/NAK signal multiplexed by CDM. Thus, by decreasing the repetition count to facilitate transmission when the number of OFDM symbols is set at 2, resources are efficiently utilized.

Compared with the transmission method shown in FIG. 7(b), four time-frequency axis transmission repetitions of the ACK/NAK signal are reduced to two transmission repetitions in FIG. 7(c). However, because the number of OFDM symbols used for the ACK/NAK signal transmission is incremented, the transmission method shown in FIG. 7(c) is similar to the method shown in FIG. 7(a), where a single OFDM symbol is used, because four time-frequency resource areas are available in both the methods shown in FIGS. 7(a) and 7(c).

Furthermore, compared to the transmission method shown in FIG. 7(b), the method shown in FIG. 7(c) may reduce the signal power for ACK/NAK channel transmission because the number of time-frequency resource areas used for a single ACK/NAK channel transmission is reduced. Moreover, because the ACK/NAK channel is transmitted across the time-frequency areas, per-symbol transmission power allocation may be performed more efficiently than transmission over a single OFDM symbol only.

In case that ACK/NAK signals are repetitively transmitted in the same structure for all OFDM symbols to simplify a system's scheduling operation, such as when the time-frequency resources shown in FIG. 7(b) are used for example, different ACK/NAK channels may be transmitted. In particular, because double ACK/NAK channels are transmittable, more efficient resource use is achieved.

As described above, a spreading factor for multiplexing a plurality of ACK/NAK signals, a repetition count in time-frequency domain and the number of OFDM symbols for ACK/NAK signal transmission, which are explained with reference to FIG. 7, are exemplarily provided for a more accurate description of the present invention. It is understood that different spreading factors, different repetition counts and various OFDM symbol numbers are applicable to the present invention. Moreover, the embodiments shown in FIG. 7 may relate to using a single transmitting antenna that does not use transmitting antenna diversity, but may also be applicable to a 2-transmitting antenna diversity method, 4-transmitting antenna diversity method, and the like.

Figure 8:
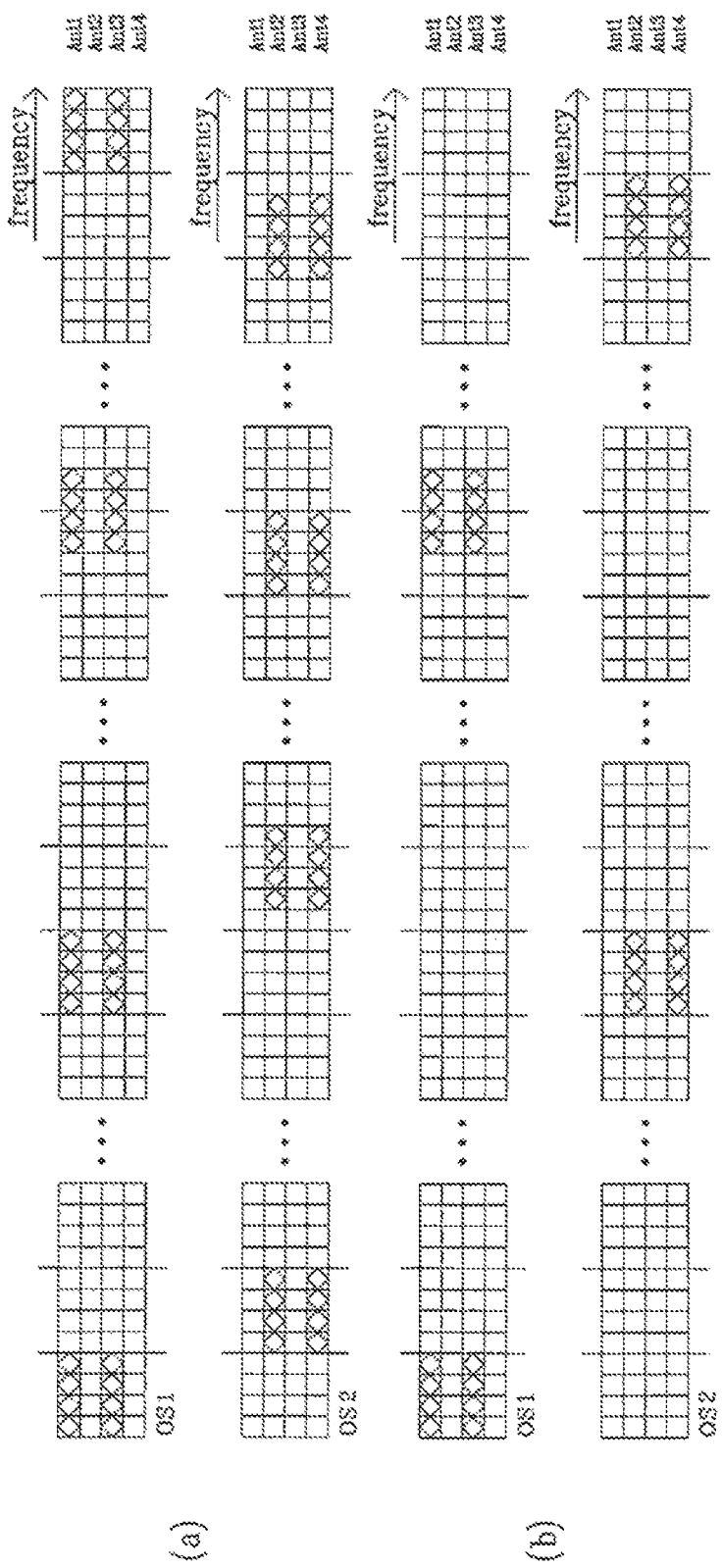
FIG. 8 is a diagram illustrating an example of a method for transmitting a spread signal via a plurality of OFDM symbols in accordance with one embodiment of the present invention, in which an SFBC/FSTD scheme is applied to the spread signal.

FIG. 8 is a diagram illustrating an example of a method for transmitting spread signals via a plurality of OFDM symbols in accordance with one embodiment of the present invention, in which an SFBC/FSTD scheme is applied to the spread signal. Referring to FIG. 8, a 4-degree transmitting antenna diversity method using a total of four transmitting antennas is implemented. Here, a single ACK/NAK channel exists for clarity and convenience of description.

In FIG. 8(a), an SFBC/FSTD scheme is applied to a spread signal using four transmitting antennas, and the signal is transmitted for a plurality of OFDM symbols. Furthermore, four ACK/NAK signals are spread with a spreading factor SF=4 for each of two OFDM symbols, multiplexed by CDM, and then transmitted via four neighbor subcarriers. Preferably, when OFDM symbols for ACK/NAK signal transmission increase, the ACK/NAK signal may be repetitively transmitted using a single OFDM symbol for the increased OFDM symbols as it is. Notably, this process is similar to the process described with reference to FIG. 7(b).

However, when a repetitive transmission is performed for a second OFDM symbol, it is carried out using an antenna set different from an antenna set used for a first OFDM symbol. For example, if a transmission for a first OFDM symbol is performed using a first antenna set including a first antenna and a third antenna, a transmission for a second OFDM symbol can be performed using a second antenna set including a second antenna and a fourth antenna. Accordingly, the transmission for the second OFDM symbol is carried out by maximizing use of subcarriers not overlapped with former subcarriers used for the first OFDM symbol. This is preferable to achieve a frequency diversity effect.

In FIG. 8(b), shown is another example of applying an SFBC/FSTD scheme to a spread signal using four transmitting antennas and transmitting the signal for a plurality of OFDM symbols in accordance with one embodiment of the present invention. Referring to FIG. 8(b), when the number of OFDM symbols for ACK/NAK signal transmission is set to 2, the signal may be transmitted by reducing a frequency-axis repetition count of the ACK/NAK signal multiplexed by CDM. Notably, this process is similar to the method described with reference to FIG. 7(c). However, when repetitive transmission is carried out for a second OFDM symbol, the transmission will be performed using an antenna set different from the antenna set used for the first OFDM symbol.

FIG. 9 is a diagram illustrating an example for a method of applying an SFBC/FSTD scheme to a spread signal in a communication system in accordance with one embodiment of the present invention. Referring to FIG. 9, when a total of four transmitting antennas are used, a first antenna set includes a first antenna and second antenna, and a second antenna set includes a third antenna and fourth antenna. Preferably, each of the first and second antenna sets is an antenna set for performing SFBC coding and an FSTD scheme applicable between the two antenna sets. According to the present embodiment, if data is transmitted for a single OFDM symbol, the signal spread with SF=2, as shown in FIG. 9, can be transmitted via two neighbor subcarriers of one OFDM symbol via the same SFBC-coded antenna set.

In FIG. 9(a), shown is a case where the spread signal transmitted via the first antenna set is different from the spread signal transmitted via the second antenna set. In FIG. 9(b), shown is a case where the spread signal transmitted via the first antenna set is repeatedly transmitted via the second antenna set to obtain a 4-degree transmitting antenna diversity gain.

Accordingly, with regard to FIG. 9, a single signal may be spread with SF=2. Thus, the same structure as applying an SFBC/FSTD scheme by 4-subcarrier unit for a CDM-multiplexed signal may be used, but without considering spreading as in FIG. 1.

FIG. 10 is a diagram for illustrating another example of a method for applying an SFBC/FSTD scheme to spread signals in a communication system in accordance with one embodiment of the present invention. In the embodiment shown in FIG. 10, like the former embodiment shown in FIG. 9, at least one or more signals are spread by (pseudo) orthogonal code or the like with SF=2. The at least one or more spread signals are also multiplexed and transmitted by CDM. Here, the multiplexed signals are transmitted via the same antenna set.

In FIG. 10, unlike FIG. 9, when a total of four transmitting antennas are used, a first antenna set includes a first antenna and third antenna, and a second antenna set includes a second antenna and fourth antenna. Thus, compared to FIG. 9, FIG. 10 illustrates use of a different method for constructing each antenna set but applies the same SFBC/FSTD scheme. In accordance with the present embodiment, the signal spread with SF=2 may be transmitted via two neighbor subcarriers of one OFDM symbol via the same SFBC-coded antenna set.

In FIG. 10(a), shown is a case where the spread signal transmitted via the first antenna set is different from the spread signal transmitted via the second antenna set. In FIG. 10(b), shown is a case where the spread signal transmitted via the first antenna set is repeatedly transmitted via the second antenna set to obtain a 4-degree transmitting antenna diversity gain.

Accordingly, with regard to FIG. 10, a single signal may be spread by SF=2. Thus, the same structure as applying SFBC/FSTD by 4-subcarrier unit for a CDM-multiplexed signal may be used without considering spreading as in FIG. 1.

Figure 11:
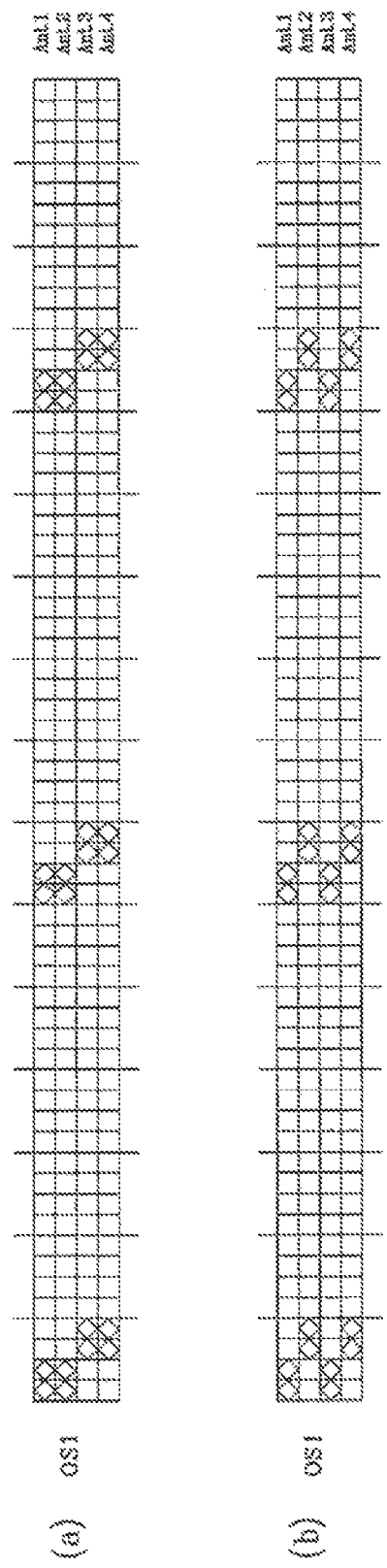
FIG. 11 is a diagram illustrating another example of a method for applying an SFBC/FSTD scheme to a spread signal in a communication system in accordance with one embodiment of the present invention.

FIG. 11 is a diagram illustrating another example of a method for applying an SFBC/FSTD scheme to spread signals in a communication system in accordance with one embodiment of the present invention. In accordance with the present invention, a same signal can be repeatedly transmitted to obtain additional diversity. In particular, the same signal may be repeatedly transmitted at least once via different subcarriers on a frequency axis, i.e., for a period of the same time unit.

Referring to FIG. 11, an antenna set is determined as follows in accordance with the present invention. After a signal has been spread with SF=2, a plurality of the spread signals are multiplexed. An antenna set is then determined by 2-subcarrier unit to enable the spread signal to be transmitted via the same antenna set. In this case, the signal is repeatedly transmitted by changing an antenna set in case of repetitive transmission to apply the SFBC/FSTD scheme for obtaining the 4-degree transmitting antenna diversity. Accordingly, an antenna-frequency mapping structure, to which the SFBC/FSTD scheme for obtaining 4-degree transmitting antenna diversity gain is applied, is repeated by 4-subcarrier unit.

In FIG. 11(a), shown is an example where the repetitive transmission method is applied to the embodiment described with reference to FIG. 9. In FIG. 11(b), shown is an example where the repetitive transmission method is applied to the embodiment described with reference to FIG. 10. In particular, FIG. 11(a) and FIG. 11(b) illustrate examples for applying the SFBC/FSTD scheme using four neighbor subcarriers, respectively. Notably, FIGS. 11(a) and 11(b) differ from each other with respect to the antennas included in the first and second antenna sets, but use the same method in applying the described embodiment.

Figure 12:
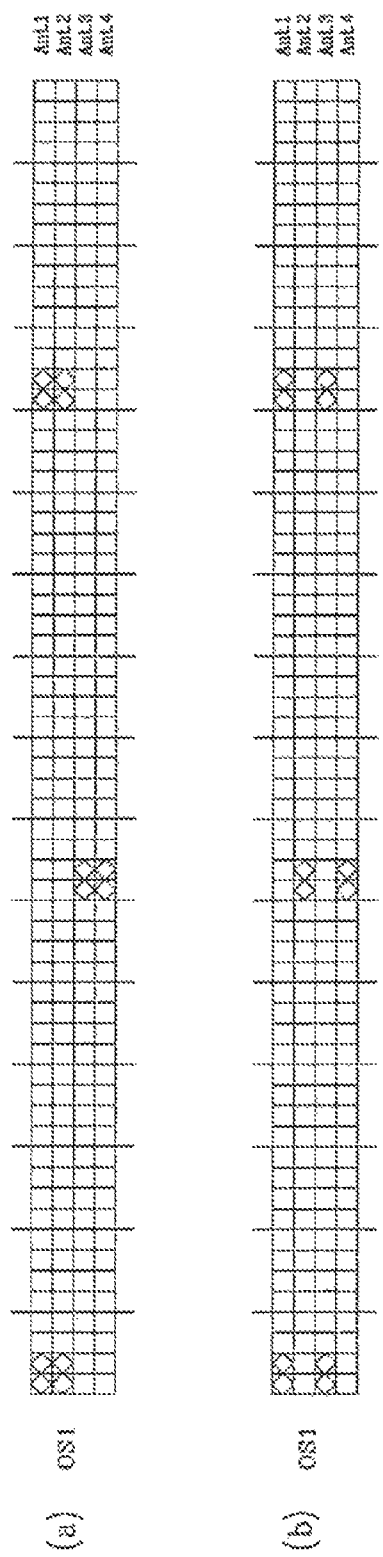
FIG. 12 is a diagram illustrating another example of a method for applying an SFBC/FSTD scheme to a spread signal in a communication system in accordance with one embodiment of the present invention.

FIG. 12 is a diagram illustrating another example of a method for applying an SFBC/FSTD scheme to spread signals in a communication system in accordance with one embodiment of the present invention. In FIG. 12, like the embodiment shown in FIG. 11, after a plurality of signals spread with SF=2 have been multiplexed, an antenna set is determined by 2-subcarrier unit to enable the spread signals to be transmitted via the same antenna set. Here, the signal may be repeatedly transmitted by changing an antenna set in case of repetitive transmission to apply the SFBC/FSTD scheme for obtaining the 4-degree transmitting antenna diversity.

However, unlike the embodiment shown in FIG. 11 wherein the SFBC/FSTD scheme is applied through the four neighbor subcarriers, the embodiment of FIG. 12 uses a subcarrier having a prescribed interval by comparing a subcarrier used for repetitive transmission to that of a previous transmission. Notably, it is preferable that subcarriers through which a spread signal sequence is multiplexed and transmitted include subcarriers that neighbor each other.

In FIG. 12(a), shown is an example where a repetitive transmission method is applied to the embodiment described with reference to FIG. 9. In FIG. 12(b), shown is an example where a repetitive transmission method is applied to the embodiment described with reference to FIG. 10. Notably, FIGS. 12(a) and 12(b) differ from each other with respect to the antennas included in the first and second antenna sets but use the same method in applying the described embodiment.

Accordingly, the embodiment of FIG. 12 may be described as follows. First, a one-time transmission is first performed using two of four subcarriers to which an SFBC/FSTD scheme is applied. The one-time transmission is then carried out using two of four subcarriers to which a next SFBC/FSTD scheme is applied. In this case, an antenna set different from that of a previous transmission is used to implement the SFBC/FSTD scheme.

Figure 13:
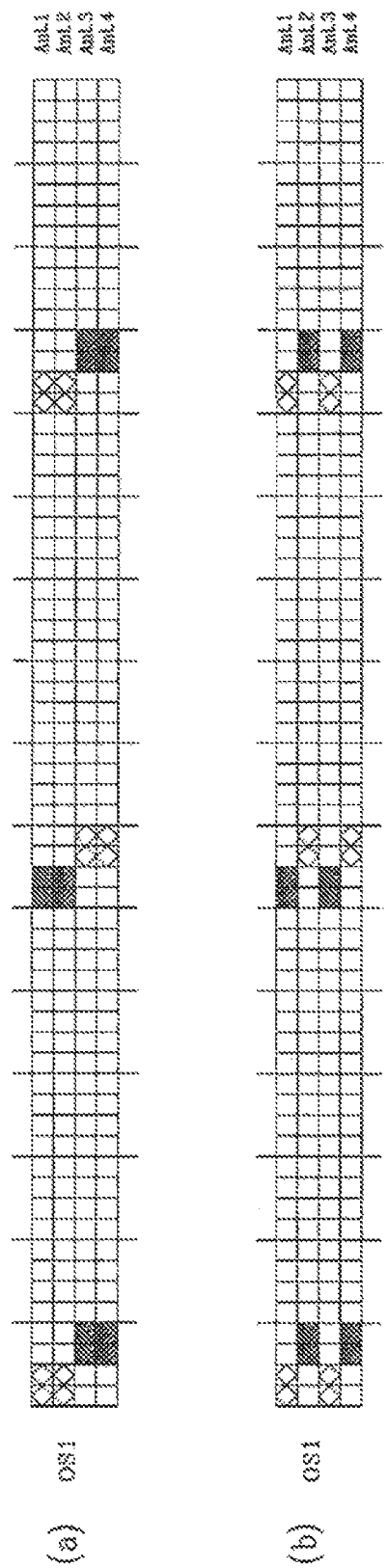
FIG. 13 is a diagram illustrating an example of a method for applying an SFBC/FSTD scheme to at least one spread signal in a communication system in accordance with one embodiment of the present invention.

FIG. 13 is a diagram illustrating an example of a method for applying an SFBC/FSTD scheme to at least one spread signal in a communication system in accordance with one embodiment of the present invention. Preferably, if an antenna-frequency mapping structure according to the SFBC/FSTD transmission scheme shown in FIG. 1 is maintained collectively for each OFDM symbol or subframe on a system, then the rest of an SFBC antenna set unused in the SFBC/FSTD scheme of FIG. 12 may be used for another data transmission.

Referring to FIG. 13, the same antenna-frequency mapping structure in the SFBC/FSTD scheme for obtaining 4-degree transmitting antenna diversity gain by the 4-subcarrier unit (described with reference to FIG. 1) is used. Accordingly, two different multiplexed signals may be transmitted using this structure. Here, each of the multiplexed signals is a multiplexed signal spread by SF=2, and can be transmitted through two subcarriers.

As applied, in the SFBC/FSTD transmission scheme for transmitting a random multiplexed signal generated from multiplexing a plurality of spread data signals, a second antenna set other than a first antenna set to be SFBC-coded can be used to transmit another multiplexed signal. Moreover, by repeatedly transmitting the multiplexed signals via the first and second antenna sets, the multiplexed signals may respectively be transmitted through the different antenna sets. Hence, a 4-degree transmitting antenna diversity effect may be obtained.

For example, a first multiplexed signal is transmitted via first antenna set and a second multiplexed signal is transmitted via second antenna set. In case of a repetitive transmission, mapping between a multiplexed signal and an antenna is changed. Accordingly, the second multiplexed signal will be transmitted via the first antenna set, while the first multiplexed signal is transmitted via the second antenna set. In case of a next repetitive transmission, the mapping between the multiplexed signal and the antenna is changed again to perform the corresponding transmission. Thus, the first multiplexed signal will again be transmitted via first antenna set and the second multiplexed signal will again be transmitted via second antenna set. Accordingly, if transmission is performed in the above-mentioned manner, resources are efficiently used. Moreover, the antenna-frequency mapping structure in the SFBC/FSTD scheme described with reference to FIG. 1 will be maintained.

In the example above, the signal spread by SF=2 is transmitted via a single OFDM symbol only. If so, repetition on a frequency axis is possible to obtain additional frequency diversity. However, using a single OFDM symbol is merely exemplary for illustrating the present invention. As mentioned in the foregoing description of SF=4, the present embodiment is applicable to a case of using several OFDM symbols.

When transmitting via several OFDM symbols, repetition on a time axis as well as a frequency axis is applicable to obtain diversity in addition to transmitting antenna diversity. The above embodiments are provided to explain applications of the present invention and are also applicable to a system using an SFBC/FSTD transmission diversity method regardless of various spreading factors (SF), various OFDM symbols numbers and repetition counts on time and frequency axes.

Figure 14:
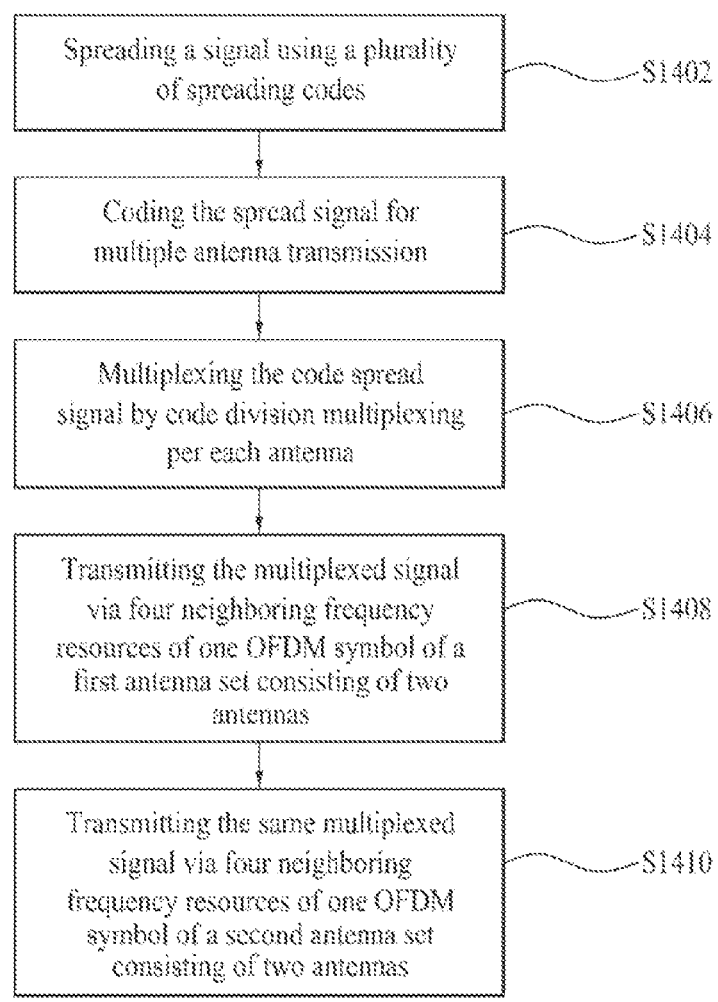
FIG. 14 is a diagram illustrating an example of a method for transmitting a spread signal in a mobile communication system in accordance with one embodiment of the present invention.

FIG. 14 is a diagram illustrating an example of a method for transmitting a spread signal in a mobile communication system in accordance with one embodiment of the present invention. Referring to FIG. 14, a transmitting end spreads a signal using a plurality of spreading codes (S1402). The plurality of spreading codes have a spreading factor of 4. The transmitting end codes the spread signal for multiple antenna transmission (S1404). The transmitting end multiplexes the coded spread signal by code division multiplexing per each antenna (S1406). The transmitting end transmits the multiplexed signal via four neighboring frequency resources of one OFDM symbol of a first antenna set consisting of two antennas (S1408). The transmitting end transmits the same multiplexed signal via four neighboring frequency resources of one OFDM symbol of a second antenna set consisting of two antennas (S1410). The multiplexed signal transmitted via the first antenna set and the multiplexed signal transmitted via the second antenna set are transmitted via respectively different OFDM symbols. The multiplexed signal transmitted via the first antenna set and the multiplexed signal transmitted via the second antenna set are separated from each other in a frequency domain.

Figure 15:
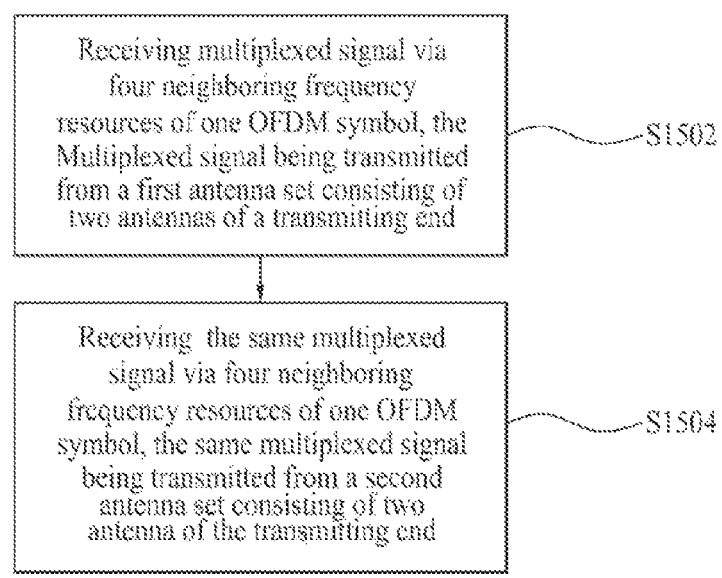
FIG. 15 is a diagram illustrating an example of a method for receiving a spread signal in a mobile communication system in accordance with one embodiment of the present invention.

FIG. 15 is a diagram illustrating an example of a method for receiving a spread signal in a mobile communication system in accordance with one embodiment of the present invention. Referring to FIG. 15, a receiving end receives multiplexed signal via four neighboring frequency resources of one OFDM symbol, the multiplexed signal being transmitted from a first antenna set consisting of two antennas of a transmitting end (S1502). The receiving end receives the same multiplexed signal via four neighboring frequency resources of one OFDM symbol, the same multiplexed signal being transmitted from a second antenna set consisting of two antennas of the transmitting end (S1504). The multiplexed signal transmitted via the first antenna set and the multiplexed signal transmitted via the second antenna set are transmitted from the transmitting end via respectively different OFDM symbols. The multiplexed signal is obtained at the transmitting end from a coded spread signal using code division multiplexing per each antenna. The coded spread signal is obtained at the transmitting end by coding a spread signal between the two antennas in the first antenna set and the second antenna set.

Embodiments of the present invention can be implemented by various means, e.g., hardware, firmware, software, and any combination thereof. In case of the implementation by hardware, a method of transmitting a spread signal in a communication system according to one embodiment of the present invention can be implemented by at least one of application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

Figure 16:
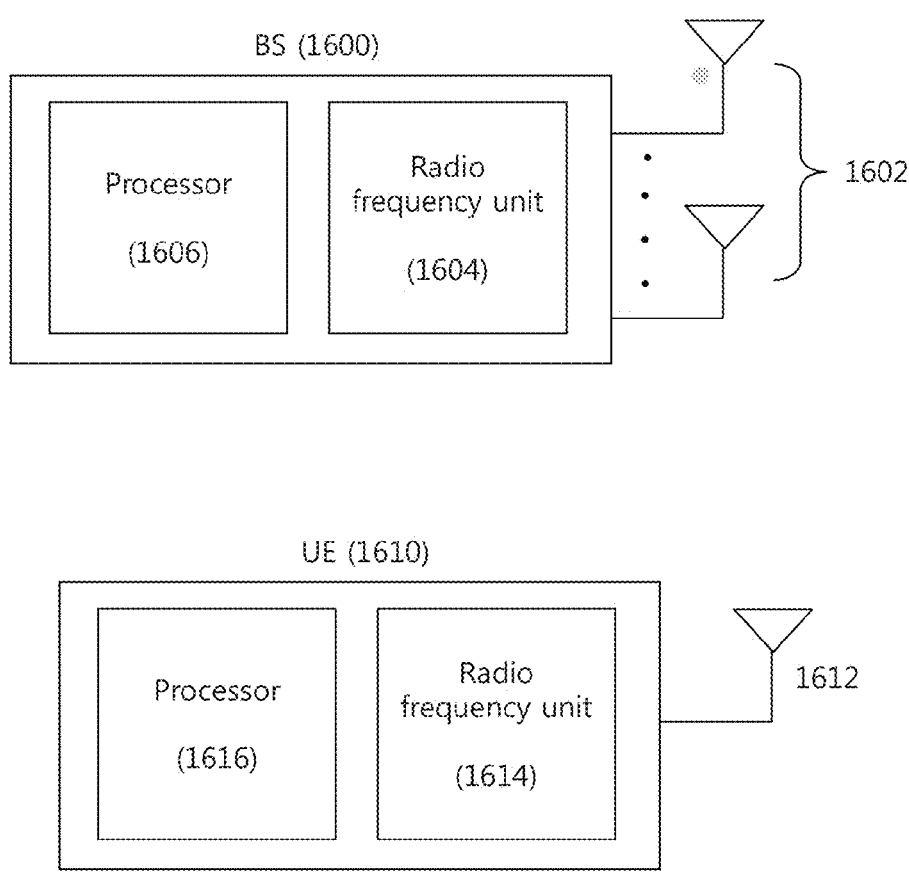
FIG. 16 is a diagram illustrating an example of a base station and a user equipment in a mobile communication system in accordance with one embodiment of the present invention.

FIG. 16 is a diagram illustrating an example of a base station and a user equipment in a mobile communication system in accordance with one embodiment of the present invention. Referring to FIG. 16, the base station (BS) (1600) includes one or more antennas (1602), a radio frequency unit (1604), and a processor (1606) and the user equipment (UE) (1610) includes an antenna (1612), a radio frequency unit (1614), and a processor (1616).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for transmitting Acknowledgement/Negative acknowledgement (ACK/NACK) information in a mobile communication system, the method performed by a base station and comprising:

transmitting a first signal including first spread ACK/NACK information in an orthogonal frequency division multiplexing (OFDM) symbol, the first spread ACK/NACK information existing only in a first antenna set in a form as shown in an upper half of Table 1; and transmitting a second signal including second spread ACK/NACK information in an OFDM symbol, the second spread ACK/NACK information existing only in a second antenna set in a form as shown in a lower half of Table 1:

TABLE 1

| | | four available neighboring subcarriers | | | |
|---|---|---|---|---|---|
| the first antenna set | antenna A | $a_1$ | $a_2$ | $a_3$ | $a_4$ |
| | antenna B | $-a_2^*$ | $a_1^*$ | $-a_4^*$ | $a_3^*$ |
| the second antenna set | antenna C | $b_1$ | $b_2$ | $b_3$ | $b_4$ |
| | antenna D | $-b_2^*$ | $b_1^*$ | $-b_4^*$ | $b_3^*$ | wherein $a_1$ to $a_4$ are first to fourth elements, respectively, of the first spread ACK/NACK information, $b_1$ to $b_4$ are first to fourth elements, respectively, of the second spread ACK/NACK information, and the symbol "*" denotes a conjugate operation, wherein the first spread ACK/NACK information and the second spread ACK/NACK information carry identical ACK/NACK information, and wherein the four available neighboring subcarriers for the first spread ACK/NACK information are separated from the four available neighboring subcarriers for the second spread ACK/NACK information by a plurality of subcarriers in a frequency domain.

2. The method of claim 1, wherein the four available neighboring subcarriers for the first spread ACK/NACK information and the four available neighboring subcarriers for the second spread ACK/NACK information exist on different OFDM symbols.

3. The method of claim 1, further comprising:

transmitting a third signal including third spread ACK/NACK information in an OFDM symbol, the third spread ACK/NACK information existing only in the first antenna set in a form as shown in the upper half of Table 1, in which $a_1$ to $a_4$ are replaced with $c_1$ to $c_4$, respectively, wherein $c_1$ to $c_4$ are elements of the third spread ACK/NACK information, wherein the first spread ACK/NACK information and the third spread ACK/NACK information carry identical ACK/NACK information, and wherein the four available neighboring subcarriers for the first spread ACK/NACK information are separated from the four available neighboring subcarriers for the third spread ACK/NACK information by a plurality of subcarriers in a frequency domain.

4. The method of claim 1, wherein antennas A and B are first two contiguously numbered antennas, and antennas C and D are second two contiguously numbered antennas.

5. The method of claim 1, wherein antennas A and B are odd-numbered antennas, and antennas C and D are even-numbered antennas.

6. A method of communicating in a mobile communication system comprising a user equipment (UE) and a base station (BS), the method comprising:

transmitting, by the BS, a first signal including first spread Acknowledgement/Negative acknowledgement (ACK/NACK) information in an orthogonal frequency division multiplexing (OFDM) symbol, the first spread ACK/NACK information existing only in a first antenna set in a form as shown in an upper half of Table 1;

transmitting, by the BS, a second signal including second spread ACK/NACK information in an OFDM symbol, the second spread ACK/NACK information existing only in a second antenna set in a form as shown in a lower half of Table 1;

receiving, by the UE, the first signal from the first antenna set of the BS; and receiving, by the UE, the second signal from the second antenna set of the BS:

TABLE 1

| | | four available neighboring subcarriers | | | |
|---|---|---|---|---|---|
| the first antenna set | antenna A | $a_1$ | $a_2$ | $a_3$ | $a_4$ |
| | antenna B | $-a_2^*$ | $a_1^*$ | $-a_4^*$ | $a_3^*$ |
| the second antenna set | antenna C | $b_1$ | $b_2$ | $b_3$ | $b_4$ |
| | antenna D | $-b_2^*$ | $b_1^*$ | $-b_4^*$ | $b_3^*$ | wherein $a_1$ to $a_4$ are first to fourth elements, respectively, of the first spread ACK/NACK information, $b_1$ to $b_4$ are first to fourth elements, respectively, of the second spread ACK/NACK information, and the symbol "*" denotes a conjugate operation, wherein the first spread ACK/NACK information and the second spread ACK/NACK information carry identical ACK/NACK information, and wherein the four available neighboring subcarriers for the first spread ACK/NACK information are separated from the four available neighboring subcarriers for the second spread ACK/NACK information by a plurality of subcarriers in a frequency domain.

7. The method of claim 6, wherein the four available neighboring subcarriers for the first spread ACK/NACK information and the four available neighboring subcarriers for the second spread ACK/NACK information exist on different OFDM symbols.

8. The method of claim 6, further comprising:

receiving, by the UE, a third signal including third spread ACK/NACK information in an OFDM symbol from the first antenna set of the BS, the third spread ACK/NACK information existing in a form as shown in the upper half of Table 1, in which $a_1$ to $a_4$ are replaced with $c_1$ to $c_4$, respectively, wherein $c_1$ to $c_4$ are elements of the third spread ACK/NACK information, wherein the four available neighboring subcarriers for the first spread ACK/NACK information are separated from the four available neighboring subcarriers for the third spread ACK/NACK information by a plurality of subcarriers in a frequency domain.

9. The method of claim 6, wherein antennas A and B are first two contiguously numbered antennas, and antennas C and D are second two contiguously numbered antennas.

10. The method of claim 6, wherein antennas A and B are odd-numbered antennas, and antennas C and D are even-numbered antennas.

11. A base station for use in a mobile communication system, the base station comprising:

a radio frequency unit configured to transmit a radio frequency signal; and a processor operably coupled to the radio frequency unit and configured to control the radio frequency unit to:

transmit a first signal including first spread Acknowledgement/Negative acknowledgement (ACK/NACK) information in an orthogonal frequency division multiplexing (OFDM) symbol, the first spread ACK/NACK information existing only in a first antenna set in a form as shown in an upper half of Table 1; and transmit a second signal including second spread ACK/NACK information in an OFDM symbol, the second spread ACK/NACK information existing only in a second antenna set in a form as shown in a lower half of Table 1:

TABLE 1

| | | four available neighboring subcarriers | | | |
|---|---|---|---|---|---|
| the first antenna set | antenna A | $a_1$ | $a_2$ | $a_3$ | $a_4$ |
| | antenna B | $-a_2^*$ | $a_1^*$ | $-a_4^*$ | $a_3^*$ |
| the second antenna set | antenna C | $b_1$ | $b_2$ | $b_3$ | $b_4$ |
| | antenna D | $-b_2^*$ | $b_1^*$ | $-b_4^*$ | $b_3^*$ | wherein $a_1$ to $a_4$ are first to fourth elements, respectively, of the first spread ACK/NACK information, $b_1$ to $b_4$ are first to fourth elements, respectively, of the second spread ACK/NACK information, and the symbol "*" denotes a conjugate operation, wherein the first spread ACK/NACK information and the second spread ACK/NACK information carry identical ACK/NACK information, and wherein the four available neighboring subcarriers for the first spread ACK/NACK information are separated from the four available neighboring subcarriers for the second spread ACK/NACK information by a plurality of subcarriers in a frequency domain.

12. The base station of claim 11, wherein the four available neighboring subcarriers for the first spread ACK/NACK information and the four available neighboring subcarriers for the second spread ACK/NACK information exist on different OFDM symbols.

13. The base station of claim 11, wherein the processor is further configured to control the radio frequency unit to:

transmit a third signal including third spread ACK/NACK information in an OFDM symbol, the third spread ACK/NACK information existing only in the first antenna set in a form as shown in the upper half of Table 1, in which $a_1$ to $a_4$ are replaced with $c_1$ to $c_4$, respectively, wherein $c_1$ to $c_4$ are elements of the third spread ACK/NACK information, wherein the first spread ACK/NACK information and the third spread ACK/NACK information carry identical ACK/NACK information, and wherein the four available neighboring subcarriers for the first spread ACK/NACK information are separated from the four available neighboring subcarriers for the third spread ACK/NACK information by a plurality of subcarriers in a frequency domain.

14. The base station of claim 11, wherein antennas A and B are first two contiguously numbered antennas, and antennas C and D are second two contiguously numbered antennas.

15. The base station of claim 11, wherein antennas A and B are odd-numbered antennas, and antennas C and D are even-numbered antennas.

16. A mobile communication system including a user equipment (UE) and a base station (BS), the BS comprising:

a first radio frequency unit configured to transmit a radio frequency signal; and a first processor operably coupled to the first radio frequency unit and configured to control the first radio frequency unit to:

transmit a first signal including first spread Acknowledgement/Negative acknowledgement (ACK/NACK) information in an orthogonal frequency division multiplexing (OFDM) symbol, the first spread ACK/NACK information existing only in a first antenna set in a form as shown in an upper half of Table 1; and transmit a second signal including second spread ACK/NACK information in an OFDM symbol, the second spread ACK/NACK information existing only in a second antenna set in a form as shown in a lower half of Table 1; and the UE comprising:

a second radio frequency unit configured to receive a radio frequency signal; and a second processor operatively coupled to the second radio frequency unit and configured to control the second radio frequency unit to:

receive the first signal from the first antenna set of the BS; and receive the second signal from the second antenna set of the BS:

TABLE 1

| | | four available neighboring subcarriers | | | |
|---|---|---|---|---|---|
| the first antenna set | antenna A | $a_1$ | $a_2$ | $a_3$ | $a_4$ |
| | antenna B | $-a_2^*$ | $a_1^*$ | $-a_4^*$ | $a_3^*$ |
| the second antenna set | antenna C | $b_1$ | $b_2$ | $b_3$ | $b_4$ |
| | antenna D | $-b_2^*$ | $b_1^*$ | $-b_4^*$ | $b_3^*$ | wherein $a_1$ to $a_4$ are first to fourth elements, respectively, of the first spread ACK/NACK information, $b_1$ to $b_4$ are first to fourth elements, respectively, of the second spread ACK/NACK information, and the symbol "*" denotes a conjugate operation, wherein the first spread ACK/NACK information and the second spread ACK/NACK information carry identical ACK/NACK information, and wherein the four available neighboring subcarriers for the first spread ACK/NACK information are separated from the four available neighboring subcarriers for the second spread ACK/NACK information by a plurality of subcarriers in a frequency domain.

17. The mobile communication system of claim 16, wherein the four available neighboring subcarriers for the first spread ACK/NACK information and the four available neighboring subcarriers for the second spread ACK/NACK information exist on different OFDM symbols.

18. The mobile communication system of claim 16, wherein the second processor is further configured to control the second radio frequency unit to receive a third signal including third spread ACK/NACK information in an OFDM symbol from the first antenna set of the BS, the third spread ACK/NACK information existing in a form as shown in the upper half of Table 1, in which $a_1$ to $a_4$ are replaced with $c_1$ to $c_4$, respectively, wherein $c_1$ to $c_4$ are elements of the third spread ACK/NACK information, wherein the first spread ACK/NACK information and the third spread ACK/NACK information carry identical ACK/NACK information, and wherein the four available neighboring subcarriers for the first spread ACK/NACK information are separate from the four available neighboring subcarriers for the third spread ACK/NACK information by a plurality of subcarriers in a frequency domain.

19. The mobile communication system of claim 16, wherein antennas A and B are first two contiguously numbered antennas, and antennas C and D are second two contiguously numbered antennas.

20. The mobile communication system of claim 16, wherein antennas A and B are odd-numbered antennas, and antennas C and D are even-numbered antennas.

* * * * *